US008391340B2

(12) United States Patent
Weill

(10) Patent No.: US 8,391,340 B2
(45) Date of Patent: Mar. 5, 2013

(54) LOW COST, HIGH PERFORMANCE GPS/GNSS RECEIVER ARCHITECTURE

(75) Inventor: Lawrence R. Weill, Seal Beach, CA (US)

(73) Assignee: Magellan Systems Japan, Inc., Hyogo (JP)

( * ) Notice: Subject to any disclaimer, the term of this patent is extended or adjusted under 35 U.S.C. 154(b) by 364 days.

(21) Appl. No.: 12/677,787

(22) PCT Filed: Sep. 15, 2008

(86) PCT No.: PCT/US2008/076414
§ 371 (c)(1),
(2), (4) Date: Mar. 11, 2010

(87) PCT Pub. No.: WO2009/036434
PCT Pub. Date: Mar. 19, 2009

(65) Prior Publication Data
US 2010/0208775 A1    Aug. 19, 2010

Related U.S. Application Data

(60) Provisional application No. 60/993,834, filed on Sep. 14, 2007.

(51) Int. Cl.
*H04B 1/00* (2006.01)
(52) U.S. Cl. ........ 375/150; 375/149; 375/142; 375/147; 375/343; 375/137; 375/E1.002; 375/E1.016; 375/E1.003; 342/357.22; 342/357.39; 342/357.71; 342/357.73; 342/189; 342/357.63; 342/357.62; 342/357.65; 342/357.69; 342/357.78
(58) Field of Classification Search .................. 375/149, 375/150, 343, 208, 142, 147, 137, E1.002, 375/E1.016, E1.003; 342/357.22, 357.39, 342/357.71, 357.73, 189, 357.63, 357.62, 342/357.65, 357.69, 357.78, 357.12
See application file for complete search history.

(56) References Cited

U.S. PATENT DOCUMENTS
4,086,657 A    4/1978    Gaskill, Jr. et al.
(Continued)

FOREIGN PATENT DOCUMENTS
| JP | 2004-340855 | 2/2004 |
|----|-------------|--------|
| JP | 2005-55375  | 3/2005 |
| JP | 2005-69764  | 3/2005 |
| JP | 2005-148005 | 6/2005 |

(Continued)

OTHER PUBLICATIONS

International Search Report from PCT/US2008/076414, dated Mar. 31, 2009.

(Continued)

*Primary Examiner* — Daniel Washburn
*Assistant Examiner* — Rahel Guarino
(74) *Attorney, Agent, or Firm* — Beyer Law Group LLP

(57) ABSTRACT

A low-cost GPS/GNSS receiver receives a satellite signal at an RF frequency (fRF). The GPS/GNSS receiver includes a front end section for receiving the satellite signal and generating a digital complex signal having a first bandwidth, the received satellite signal being converted into a complex signal before digitizing, a signal capturing section for searching for and acquiring the satellite signal, the signal capturing section including a capture memory, a baseband processor for tracking the acquired satellite signal, and a signal splitter coupled to the front end section. The signal splitter splits the digital complex signal into two bandwidths, by generating a narrowband digital complex signal having a second bandwidth substantially smaller than the first bandwidth. The signal splitter provides the narrowband digital signal to the capture memory and the wider first bandwidth digital complex signal to the baseband processor.

41 Claims, 19 Drawing Sheets

U.S. PATENT DOCUMENTS

| | | | |
|---|---|---|---|
| 4,918,706 A | 4/1990 | Phillips et al. | |
| 5,535,278 A | 7/1996 | Cahn et al. | |
| 5,576,715 A | 11/1996 | Litton et al. | |
| 6,031,881 A | 2/2000 | Weill et al. | |
| 6,246,361 B1 | 6/2001 | Weill et al. | |
| 6,370,207 B1 | 4/2002 | Weill et al. | |
| 7,102,563 B2 * | 9/2006 | Rapoport et al. | 342/357.27 |
| 7,174,241 B2 * | 2/2007 | Tsuruhara et al. | 701/1 |
| 7,362,265 B2 | 4/2008 | Weill | |
| 7,403,559 B1 | 7/2008 | Fisher et al. | |
| 7,471,241 B1 * | 12/2008 | Yang | 342/357.73 |
| 7,486,745 B2 | 2/2009 | Fisher et al. | |

FOREIGN PATENT DOCUMENTS

| | | |
|---|---|---|
| JP | 2005-164333 | 6/2005 |
| JP | 2006-28452 | 10/2006 |
| WO | WO9627139 A | 9/1996 |

OTHER PUBLICATIONS

Written Opinion from PCT/US2008/076414, dated Mar. 31, 2009.
Weill, L., N. Kishimoto, S. Hirata, and K. Chin (2004): "The Next Generation of a Super Sensitive GPS System," Proceedings of GNSS 2004 (Session A5, Long Beach, CA, Sep. 21-24), The Institute of Navigation, Fairfax, VA.

* cited by examiner

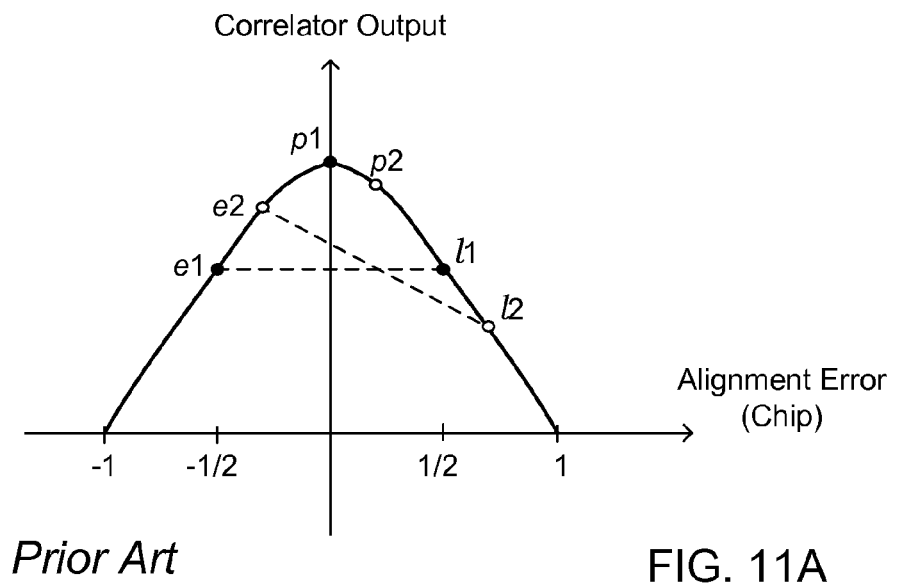
Prior Art          FIG. 11A
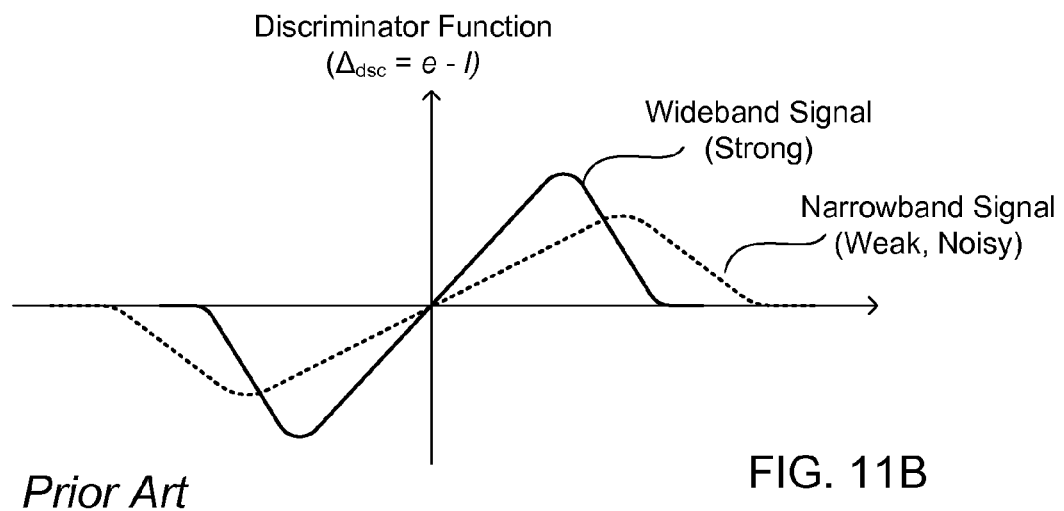
Prior Art          FIG. 11B

Received PN Code
r(t)

Early Reference Code
e(t)

Late Reference Code
l(t)

e(t) - l(t)

e(t) → p(t)
l(t) → p(t)

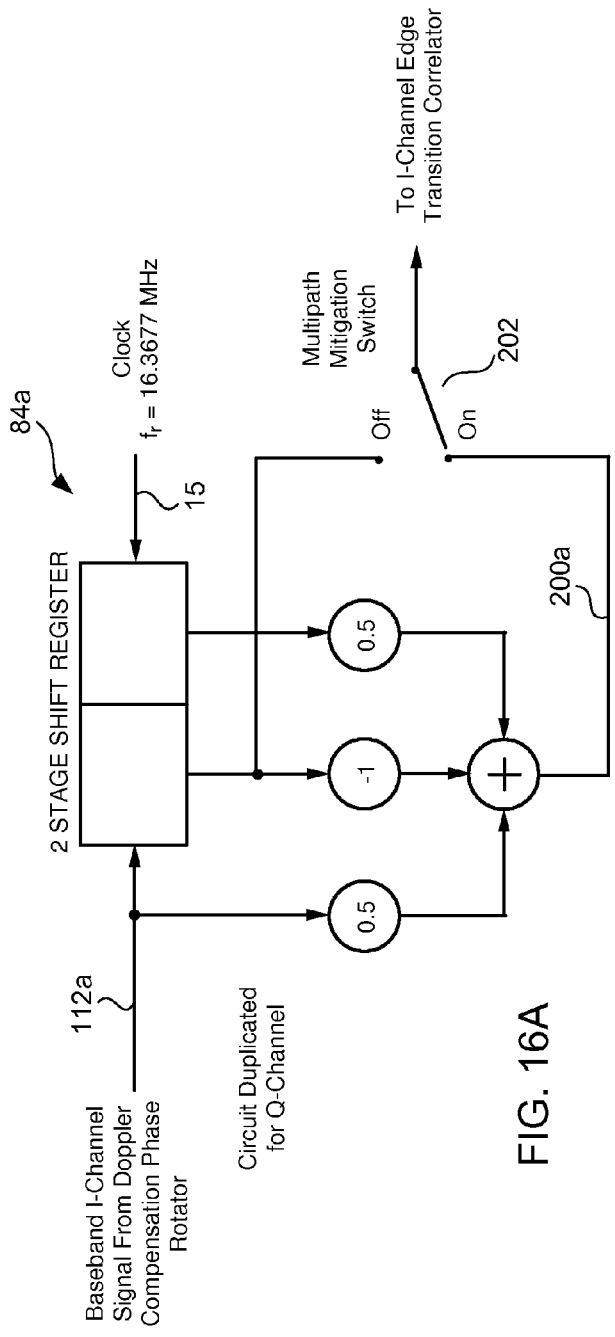
FIG. 16A
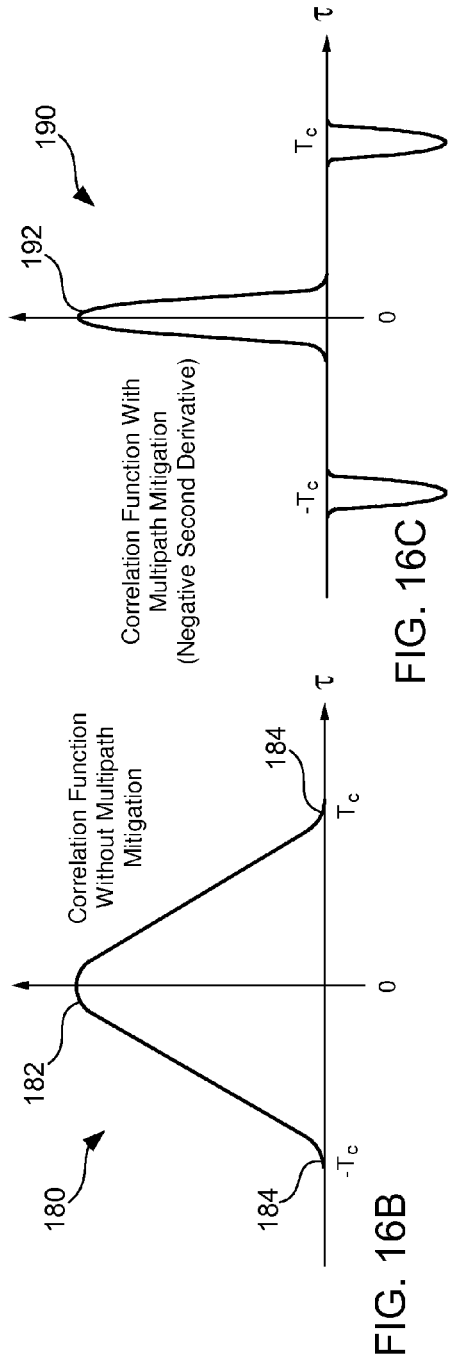
FIG. 16B
FIG. 16C

LOW COST, HIGH PERFORMANCE GPS/GNSS RECEIVER ARCHITECTURE

BACKGROUND OF THE INVENTION

The present invention relates to GPS/GNSS receivers. More specifically, the present invention relates to low-cost GPS/GNSS receivers having a small-sized memory.

There is an increasing demand for C/A code GPS receivers which are not only low in cost, but which provide superior performance in a wide variety of signal environments. Critical issues are better receiver acquisition sensitivity, a shorter time to first fix (TTFF), and the ability to track position and velocity more accurately, even with weak signals and substantial multipath. In this section, we discuss specific deficiencies in current low-cost receivers which are ameliorated by the present invention. The invention is described for a C/A code GPS receiver, but can also be incorporated in other Global Navigation Satellite System (GNSS) receivers.

Signal Bandwidth and Sampling Rate

In order to achieve a small TTFF, typical low-cost GPS receivers employ a capture memory, sometimes called a snapshot memory, which captures a digitized time segment of the received GPS signal. The signals can then be rapidly acquired by accessing this memory and searching for the signals in Doppler and delay at relatively high speed. However, this memory comprises a major portion of the receiver cost, and therefore needs to be as small as practical. For this reason, the signals emerging from a typical low-cost receiver front end (RF/IF section) have a relatively small bandwidth that can be sampled at a low rate, thus reducing snapshot memory size.

The IF (intermediate frequency) signal at the output of a typical low-cost receiver front end is real-valued (as opposed to complex-valued) with a center frequency of 4.092 MHz and a relatively narrow RF bandwidth of 2 MHz (±1 MHz) to conserve shapshot memory. Various sampling techniques are used to convert the IF output to a complex baseband signal. Sampling theory dictates that the minimum sampling rate for such a baseband signal is 2 MHz, in order to avoid detrimental spectral aliasing which would reduce signal-to-noise ratio (SNR).

Although they reduce receiver cost by reducing the size of snapshot memory, such typical design parameters, especially the narrow RF bandwidth, severely restrict the ultimate receiver performance that is possible with wider bandwidths. The benefits of a wider bandwidth are significantly improved positioning accuracy both with and without the presence of multipath, better tracking sensitivity, and more robust performance when the receiver is subject to accelerations.

It is also significant that the real-valued IF output signal in typical low-cost receivers limits the maximum RF bandwidth to twice the IF center frequency if spectral aliasing and reduced SNR are to be avoided. This limit is independent of the sampling rate used. In a few low-cost receivers a higher IF frequency is used to circumvent this limitation. However, the higher RF bandwidth that is achievable requires a higher sampling rate and larger snapshot memory size in conventional designs.

Choice of Reference Oscillator Frequency

Another performance limitation found in many low-cost receivers is caused by the use of a reference oscillator which is an integer multiple of the zero-Doppler PN (pseudonoise) code chipping rate of GPS signals (1.023 MHz). For example, a popular temperature compensated crystal oscillator (TCXO) frequency is 16.368 (16×1.023) MHz. This can cause a "beat" phenomenon between the sampling frequency and the PN code of a GPS signal which has near-zero Doppler. The effect is an oscillatory error in the PN code tracking loops, which degrades positioning accuracy.

Signal Code and Carrier Tracking

As the demand grows for better performance of low-cost GPS receivers in poor signal environments, there is a corresponding need for better performance of the delay-locked loops (DLL's) which track the GPS PN code, as well as the phase-locked loops (PLL's) and frequency-locked loops (FLL's) which track the carrier. Each satellite has it own PN code (a specific chip sequence unique to the satellite). Since the GPS L1 signal has exactly 1540 carrier cycles per C/A (Coarse/Acquisition) PN code chip, most receivers can count carrier cycles from the PLL to accurately establish the received chipping rate, including Doppler. This information is used to "rate aid" the DLL by very accurately controlling the chipping rate of the receiver-generated reference PN code for the specific satellite so that in the absence of any other DLL commands, the received and reference PN codes are stationary relative to each other. PN code correlators are used to form an error signal which is proportional to the delay difference between the received and reference codes, and this error signal is used to move the reference PN code into alignment with the received code. Rate aiding significantly reduces stress on the DLL, because the PLL can accurately track carrier cycles even during periods of receiver acceleration, thus accurately matching the received and reference PN code chipping rates.

However, PLL's cannot maintain lock when the received signal is less than approximately −149 dBm (generally regarded as a weak signal, but not as weak as a desired tracking goal of approximately −160 dBm). When PLL lock is lost, the counting of carrier cycles will tend to have very large errors, which can cause the rate-aided DLL to also lose lock. A typical solution to this problem is to switch from PLL to FLL operation when the signal falls below the PLL tracking threshold, and switch back from FLL to PLL operation if the signal rises above this threshold. FLL's have the advantage that they can track frequency at significantly smaller signal levels than a PLL, down to approximately −160 dBm, and also have a larger capture, or pull-in range. The FLL can also be used for rate aiding of the DLL, but will not do this as well as a PLL because it only tracks frequency, not phase. As a result, noise on the signal causes phase "cycle slips" which cause rate-aiding errors.

Unfortunately, switching back from FLL to PLL operation has a serious drawback. It might seem that the switch should occur when the signal rises to the PLL tracking threshold (approximately −149 dBm). However, at this signal level the pull-in range of the PLL (as small as a fraction of a Hertz) is usually smaller than the frequency tracking error of the FLL. The presence of receiver acceleration exacerbates the problem. In order to guarantee that the PLL can pull in, the threshold for switching back from FLL to PLL operation must be made significantly larger (perhaps −144 dBm or more) in conventional designs. This forces the FLL to operate in a region where the PLL would normally be able to track with better performance, assuming it had previously pulled in at a stronger signal level.

DLL Tracking Correlator Design

The standard method of DLL code tracking is to employ two correlators, called the early and the late correlators. The reference code for the early correlator is advanced in time and that of the late correlator is retarded by the same amount of time relative to the receiver generated code, called the punctual reference code. The difference in the magnitude of the correlator outputs forms an error signal which indicates the degree of misalignment of the received and punctual reference codes. The error signal passes through a filter whose output is used to shift the phase of the punctual reference code in a direction which drives the error signal to zero.

In most early GPS receivers the early and late reference codes were respectively advanced and retarded by ½ C/A code chip, resulting in an early-late spacing of 1 chip. However, circa 1994 it became widely known that a smaller spacing combined with a higher receiver bandwidth would significantly reduce pseudoranging error due to thermal noise. It was shown that with smaller spacing (a "narrow correlator") the noise from the early and late correlators becomes statistically more correlated, and thus tends to cancel in forming the error signal. An additional benefit is that multipath mitigation is also improved. With this knowledge, narrow correlator receivers with an early-late spacing of 0.1 chip or less soon began to appear, but not in low-cost consumer grade receivers.

However, the accuracy and multipath performance advantages of narrow correlators cannot be gained unless the signal has a bandwidth significantly wider than that found in typical low-cost receivers. Consequently, increasing the bandwidth in a typical low-cost receiver design requires a higher sampling rate and the increased cost of more snapshot memory.

Multipath Mitigation

Until recently, the positioning accuracy of low-cost GPS receivers has not been good enough to be seriously impaired by errors due to multipath. Therefore, in many of these receivers no attempt has been made to include receiver-based multipath mitigation techniques. But that situation is changing. Now there is an increasing demand for better positioning accuracy, even in urban canyons where multipath can be severe.

In order to achieve effective multipath mitigation, the receiver bandwidth must be much wider than in today's typical low-cost GPS receivers. Again this conflicts with the need to keep the bandwith low for cost reduction in such units.

BRIEF DESCRIPTION OF THE INVENTION

Embodiments of the present invention provide a low-cost receiver design that has high bandwidth for best performance in positioning accuracy, robustness of tracking, and multipath performance, but which still has a small TTFF using a small snapshot memory. The reference oscillator and sampling frequencies are relatively low, similar to those of current low-cost receiver designs. The bandwidth is the highest that is theoretically beneficial given the sampling rate of the signal at the output of the RF/IF front end. The receiver is also able to acquire satellites at low bandwidth using the snapshot memory at the same time it is tracking other satellites with high bandwidth. The receiver also has superior tracking sensitivity combined with robustness of tracking in dynamic environments with changing signal levels, without the problems inherent in switching between PLL and FLL tracking loops. The receiver is capable of accurately tracking phase whenever the signals are sufficiently strong (approximately −149 dBm or more). The receiver DLL correlators have performance levels equal to or better than narrow correlators, and the receiver incorporates a low-cost but effective multipath mitigation technique. Finally, the receiver does not have oscillatory positioning errors at near-zero Doppler frequencies.

A low-cost GPS/GNSS receiver receives a satellite signal at an RF frequency ($f_{RF}$). In one aspect of the invention, the GPS/GNSS receiver includes a front end section for receiving the satellite signal and generating a digital complex signal having a first bandwidth, the received satellite signal being converted into a complex signal before digitizing, a signal capturing section for searching for and acquiring the satellite signal, the signal capturing section including a capture memory, a baseband processor for tracking the acquired satellite signal, and a signal splitter coupled to the front end section. The signal splitter splitting the digital complex signal into two bandwidths, by generating a narrowband digital complex signal having a second bandwidth substantially smaller than the first bandwidth. The signal splitter provides the narrowband digital signal to the capture memory, and the wider first bandwidth digital complex signal to the baseband processor. The first bandwidth may be approximately 16 MHz and the second bandwidth may be approximately 1 MHz.

In one aspect of the invention, the signal splitter includes, for the narrowband digital signal, a digital low-pass filter having a cut-off frequency of 0.5 MHz, a sub-sampler coupled to the digital low-pass filter for reducing a sample frequency to $f_r/8$, where $f_r$ is the receiver reference oscillator frequency, and a bit decoder coupled to the sub-sampler.

In another aspect of the invention, a front end section in a low-cost GPS/GNSS receiver includes a reference oscillator for generating a global clock signal having a reference frequency ($f_r$), a first clock circuit for generating a first local clock signal having a first frequency, a second clock circuit for generating a second local clock signal having a second frequency, the second clock signal being a complex signal having an I-component for an I channel and a Q-component for a Q-channel, a third clock circuit for generating a third local clock signal having a third frequency, the third clock signal being a complex signal having an I-component for the I channel and a Q-component for the Q-channel, a first mixer for combining a received satellite signal with the first local clock signal to generate a first IF signal, a band-pass filter for band-pass filtering the first IF signal to have a first center frequency and a first bandwidth, a second mixer for generating a complex IF signal by combining the first IF signal with the second local clock signal, a low-pass filter for low-pass filtering the complex IF signal to have a second center frequency and the first bandwidth, an analog/digital converter for sampling the complex IF signal and generating a digital complex signal, and a third mixer for reducing the center frequency of the digital complex signal to a third center frequency by combining the digital complex signal with the third clock signal.

The reference frequency ($f_r$) may be approximately 16.36767 MHz; the first frequency may be approximately $100f_r$; the second frequency may be approximately $4f_r$; the third frequency may be approximately $f_r/4$; the first bandwidth may be approximately 16 MHz; the first center frequency may be approximately $(100f_r-f_{RF})$; the second center frequency may be approximately $4f_r-(100f_r--f_{RF})$; and the third center frequency may be approximately $f_r/512$.

In yet another aspect of the invention, a baseband signal processor in a low-cost GPS/GNSS receiver includes a Doppler compensation phase rotator for receiving a wideband complex digital satellite signal from a front end section of the GPS/GNSS receiver, and generating a complex baseband signal having a nominally zero frequency, the complex baseband signal carrying received PN code, a PN code generator for generating a reference code, a code tracking correlator for correlating the reference code and the received PN code by sampling the complex baseband signal at a timing and polarity given by the reference code so as to generate a DLL error signal, and a DLL code tracking loop for feeding back the DLL error signal to the PN code generator. The reference code is shifted in accordance with the DLL error signal such that the reference code aligns with the received PN code.

The baseband signal processor may further include a signal recovery correlator for receiving the complex baseband signal and correlating the reference code and the received PN code so as to output a despread complex baseband signal. The signal recovery correlator may include a mixer and an averter. The mixer multiplies the complex baseband signal with the reference code signal. The averager averages the multiplied signal over a certain period of time and outputs a complex correlation value as the despread complex baseband signal.

The code tracking correlator may include a polarity-controlled sampler for sampling the complex baseband signal at a rising edge of the reference code with a polarity and at a falling edge of the reference code with an inversed polarity so as to output sampled complex signal values, and an averager for accumulating the sampled complex signal values for a certain period of time and outputting an accumulated complex value signal, and an error signal generator for obtaining an inner product of the accumulated complex value signal and the complex correlation value to output the DLL error signal.

The baseband signal processor may further include a multipath mitigation filter coupled between the Doppler compensation phase rotator and the code tracking correlator. The multipath mitigation filter obtains an approximation of a negative of a second derivative of the complex baseband signal.

The baseband signal processor may further include an FLL carrier tracking loop and a PLL carrier tracking loop. The FLL carrier tracking loop includes frequency error detector for detecting a frequency error in the complex baseband signal and generating a frequency error signal, based on a plurality of complex correlation values output from the signal recovery correlator. The PLL carrier tracking loop includes a phase error detector for detecting a phase error in the complex baseband signal and generating a phase error signal, based on the complex correlation value output from the signal recovery correlator. The frequency error signal and the frequency error signal control the Doppler compensation phase rotator simultaneously without mutual interference. The PLL carrier tracking loop applies the phase error signal to the Doppler compensation phase rotator for a time interval at a beginning of a first period of time over which the multiplied signal is averaged in said averager of said signal recovery correlator, the time interval being significantly smaller than the first period of time.

In yet another aspect of the invention, a method processes a satellite signal having an FR frequency ($f_{RF}$) in a low-cost GPS/GNSS receiver. The method includes the steps of (a) receiving the satellite signal at a front end section, (b) generating a complex signal having a first bandwidth from the received satellite signal using a complex clock signal, (c) sampling a complex signal to generate a digital complex signal, (d) splitting the digital complex signal into two bandwidths, by (e) generating a narrowband digital complex signal from one of the split digital complex signals, the narrowband complex signal having a second bandwidth substantially smaller than the first bandwidth, (f) providing the narrowband digital complex signal to a capture memory in a signal capturing section to search for and acquire the satellite signal, and (g) providing the other of the split digital complex signals to a baseband processor for tracking the acquired satellite signal. The first bandwidth may be approximately 16 MHz and the second bandwidth may be approximately 1 MHz.

Generating the narrowband digital complex signal may include (e1) low-pass filtering the digital complex signal with a cut-off frequency of 0.5 MHz, (e2) sub-sampling the low-pass filtered digital complex signal with a sampling frequency of $f_r/8$, where $f_r$ is the receiver reference oscillator frequency, and (e3) bit decoding the sub-sampled, low-pass filtered digital complex signal.

In yet another aspect of the invention, a method processes a received satellite signal at an RF frequency ($f_{RF}$) at a front end section in a low-cost GPS/GNSS receiver. The method includes (a) generating a global clock signal having a reference frequency (fr), (b) generating a first local clock signal having a first frequency, (c) generating a second local clock signal having a second frequency, the second clock signal being a complex signal having an I-component for an I channel and a Q-component for a Q-channel, (d) generating a third local clock signal having a third frequency, the third clock signal being a complex signal having an I-component for the I channel and a Q-component for the Q-channel, (e) combining a received satellite signal with the first local clock signal to generate a first IF signal, (f) band-pass filtering the first IF signal to have a first center frequency and a first bandwidth, (g) generating a complex IF signal by combining the first IF signal with the second local clock signal, (h) low-pass filtering the complex IF signal to have a second center frequency and the first bandwidth, (i) sampling the complex IF signal and generate a digital complex signal, and (j) reducing the center frequency of the digital complex signal to a third center frequency by combining the digital complex signal with the third clock signal.

The reference frequency ($f_r$) may be approximately 16.36767 MHz; the first frequency may be approximately $100f_r$; the second frequency may be approximately $4f_r$; the third frequency may be approximately $f_r/4$; the first bandwidth may be approximately 16 MHz; the first center frequency may be approximately ($100f_r-f_{RF}$); the second center frequency may be approximately $4f_r-(100f_r-f_{RF})$; and the third center frequency may be approximately $f_r/512$.

In yet another aspect of the invention, a method tracks PN code in a received satellite signal in a low-cost GPS/GNSS receiver. The method includes (a) receiving a wideband complex digital satellite signal from a front end section of the GPS/GNSS receiver, (b) generating a complex baseband signal having a nominally zero frequency, the complex baseband signal carrying received PN code, (c) generating a reference code, (d) correlating the reference code and the received PN code by sampling the complex baseband signal at a timing and polarity given by the reference code so as to generate a DLL error signal, and (e) shifting the reference code in accordance with the DLL error signal such that the reference code aligns with the received PN code.

The method may further includes (f) correlating the reference code and the received PN code by multiplying the reference code and the complex baseband signal, and (g) averaging the multiplied signal over a certain period of time so as to output a complex correlation value as a despread complex baseband signal.

The correlating the reference code and the received PN code by sampling the complex baseband signal may include (d1) sampling the complex baseband signal at a rising edge of the reference code with a polarity and at a falling edge of the reference code with an inversed polarity so as to output sampled complex signal values, (d2) accumulating the sampled complex signal values for a certain period of time and outputting an accumulated complex value signal, and (d3) obtaining an inner product of the accumulated complex value signal and the complex correlation value to generate the DLL error signal.

The method may further includes (h) performing multipath mitigation on the complex baseband signal before (d) correlating the reference code and the received PN code, by sampling the complex baseband signal, and by obtaining an approximation of a negative of a second derivative of the complex baseband signal.

The method may further includes (i) detecting a frequency error in the complex baseband signal and generating a frequency error signal, based on a plurality of complex correlation values output from said averaging the multiplied signal, (j) detecting a phase error in the complex baseband signal and generating a phase error signal, based on the complex correlation value output from said averaging the multiplied signal, (k) controlling the frequency of the complex baseband signal based on the frequency error signal, and (l) controlling the phase of the complex baseband signal based on the phase error signal. The frequency error signal and the frequency error signal control the complex baseband signal simultaneously without mutual interference. In (l) controlling the phase of the complex baseband signal, the phase error signal is applied for a time interval at a beginning of a first period of time over which the multiplied signal is averaged in said averaging the multiplied signal, the time interval being significantly smaller than the first period of time.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the FIG.s of the accompanying drawings and in which like reference numerals refer to similar elements and in which:

FIG. 11A schematically illustrates an example of outputs from the conventional early, prompt, and late correlators.

FIG. 11B schematically illustrates an example of the code tracking discriminator function.

FIG. 16A is a schematic block diagram illustrating a multipath mitigation filter in accordance with one embodiment of the present invention.

FIGS. 16B and 16D schematically illustrate a conventional correlation function without multipath mitigation.

FIGS. 16C and 16E are schematic diagrams illustrating a correlation function with multipath mitigation (the negative second derivative) in accordance with one embodiment of the present invention.

DETAILED DESCRIPTION OF EMBODIMENTS OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention includes the following components in a GPS/GNSS receiver, which operate together to provide high performance at low cost: (1) RF/IF Section; (2) Signal Splitter; and (3) Baseband Processor, which are explained below in detail. The GPS/GNSS receiver also includes a satellite signal capturing section and a signal tracking section. The satellite signal capturing section searches and acquires the satellite signal using a narrowband signal. The baseband processor is part of the signal tracking section which uses a wideband signal to track the acquired satellite signal.

RF/IF Section

Figure 1:
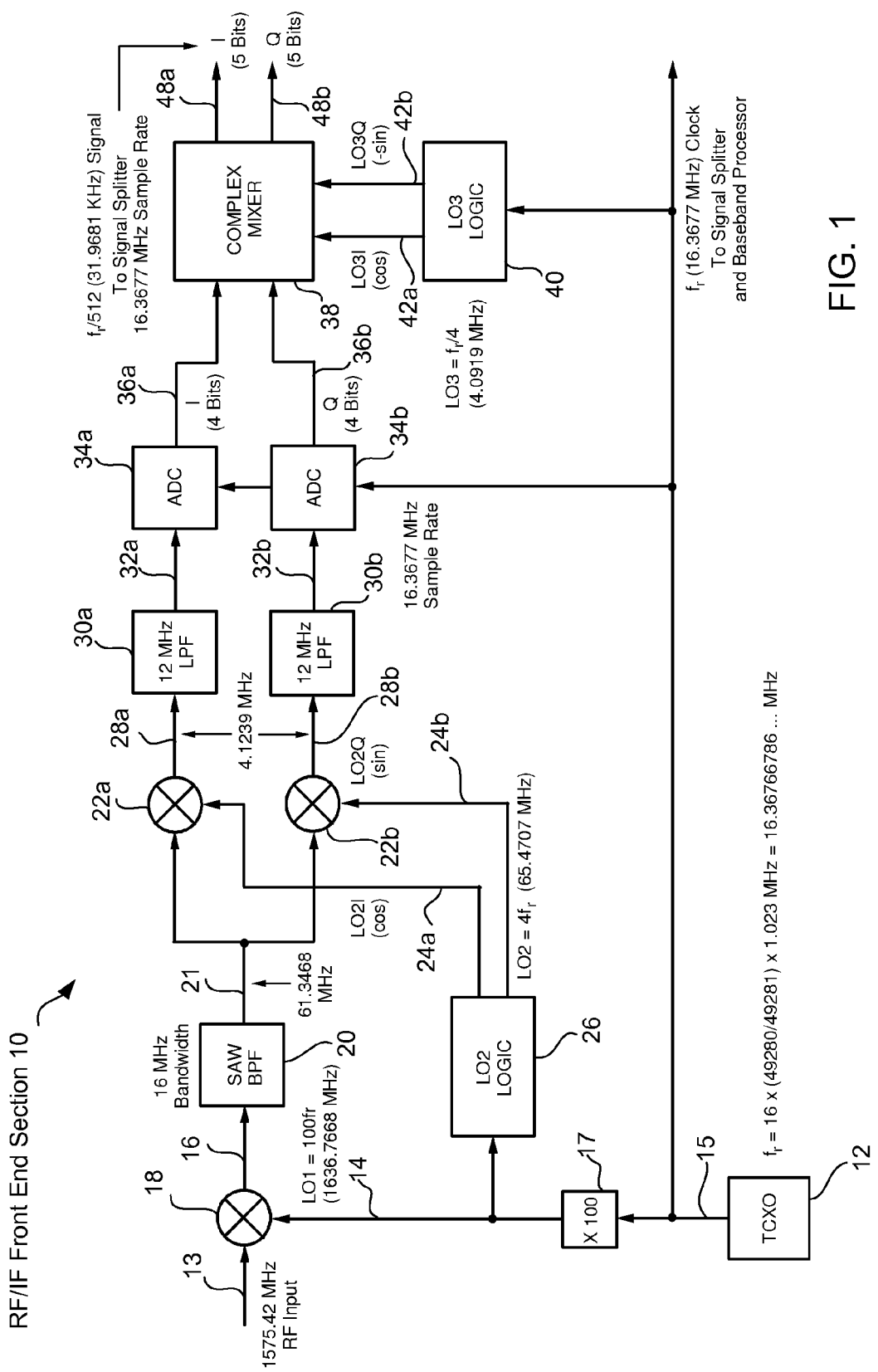
FIG. 1 is a simplified block diagram of the RF/IF section in accordance with one embodiment of the present invention.

FIG. 1 schematically illustrates a simplified block diagram of the RF/IF section 10 in accordance with one embodiment of the present invention. The RF input signal 13 is a GPS satellite signal having a carrier frequency 1575.42 MHz modulated by the PN code (chipping frequency 1.023 MHz). The reference oscillator 12 is a TCXO with a design frequency of $f_r$=16×(49280/49281)×1.023 MHz≅16.36766786388263 MHz. The reference oscillator 12 provides a global clock signal 15 for various components of the system. This frequency is 20.292 parts per million less than 16 times the zero-Doppler 1.023 MHz chipping rate of the $L_1$ GPS PN code, and has been chosen because it completely eliminates the near-zero Doppler problem yet at the same time permits an easy way to eventually frequency translate the signal down to zero Doppler using simple frequency dividers that divide by integers, in most cases powers of 2. Logic 17 produces a first local oscillator frequency from the clock signal 15. The first local oscillator frequency (LO1) is 100$f_r$≅1636.766786388263 MHz, producing a first IF signal 16 (a difference frequency signal) having a frequency of 61.34678638826299 MHz at the output of the first mixer 18 which combines the input RF signal 13 (1575.42 MHz) and the LO1 signal 14. The LO1 signal 14 can be the output of a VCO (voltage controlled oscillator) which is controlled by a PLL that compares the VCO output divided by 100 with the reference frequency $f_r$. The first IF signal 16 passes through a SAW bandpass filter 20 with a bandwidth of 16 MHz (±8 MHz) (filtered IF signal 21) and then is sent to a second mixer 22 (22a, 22b).

The second mixer 22 (22a, 22b) uses a complex-valued second local oscillator frequency (LO2) signal 24 (24a, 24b) with a frequency of 4$f_r$≅65.47067145553052 MHz, which is generated by simple LO2 logic 26 driven by the first local oscillator frequency LO1 signal 14 having the frequency 100$f_r$. Here, "complex-valued" means that the LO2 signal 24 has a cosine (real) component (I) 24a and a sine (imaginary) component (Q) 24b, as shown in FIG. 1. The I component of the signal and circuitry for the I channel are denoted by a reference numeral with "a", and the Q component of the signal and circuitry for the Q channel are denoted by a reference numeral with "b" throughout the specification. A corresponding numeral reference without "a" or "b" may be used when the I and Q components or channels are mentioned together. In addition, a complex-valued signal or complex signal means that the signal is processed in the I-channel and the Q-channel in a symmetrical and synchronized manner such that the signal Z(t) is expressed as I(t)+j(Q(t)) where j=$\sqrt{-1}$.

The output of the second mixer 22 has a second IF frequency of 65.47067145553052−61.34678638826299≅4.123885067267530 MHz, which is a complex-valued signal 28 (28a and 28b). The image frequency at 69.59455652279805 MHz and the mixer output sum frequency of 126.81745784379351 MHz are eliminated by two 12 MHz analog low-pass filters 30a and 30b (one for the cosine component (I) and one for the sine component (Q)). These filters can be simple RLC filters or active filters implemented with readily available high-speed operational amplifiers. The I and Q filter outputs 32a and 32b are fed to separate analog-digital converters (ADC's) 34a and 34b which produce 4-bit I and Q digital outputs 36a and 36b, respectively, sampled at the reference oscillator frequency $f_r$ provided from the reference oscillator 12. Four bits are used at this stage to avoid quantization losses in subsequent processing. At a later stage, bit recoding is used to cut down the capture memory size. It should be noted that the input signal is converted into a complex-valued signal by the mixer 22 prior to digitization in accordance with one embodiment of the present invention.

The digitized I and Q outputs 36a and 36b from the ADC's 34a and 34b are fed to a digital complex mixer 38 which reduces the signal center frequency to $f_r$/512≅31.9681 kHz, which will subsequently be shifted to baseband in the baseband processing section. The complex-valued local oscillator LO3 signal (LO3I signal 42a and LO3Q signal 42b) for the digital complex mixer 38 is generated by simple logic 40 and has a frequency of $f_r$/4≅4.0919 MHz. The I and Q values 48a and 48b at the mixer output are 5-bit 2's complement numbers with a sampling rate of $f_r$≅16.3677 MHz which is provided from the reference oscillator 12.

An important characteristic of the RF/IF section 10 is that it produces an output signal (I and Q values 48a and 48b) in complex form that has a 16 MHz RF bandwidth, which is the largest possible bandwidth that can be supported by the relatively low 16.3677 MHz sampling rate without spectral aliasing. This bandwidth is much larger than what typical low-cost receivers provide and is necessary for the high performance of the receiver. Because the signal is in complex form, further translation to baseband can be accomplished by a complex phase rotator without the problem of aliasing that would otherwise occur in existing low-cost designs.

To facilitate a better understanding of how the RF/IF front end operates, FIGS. 2A through 2H show the spectra of the signal at various stages, starting at the 61.347 MHz first IF and continuing to baseband.

Figure 2:
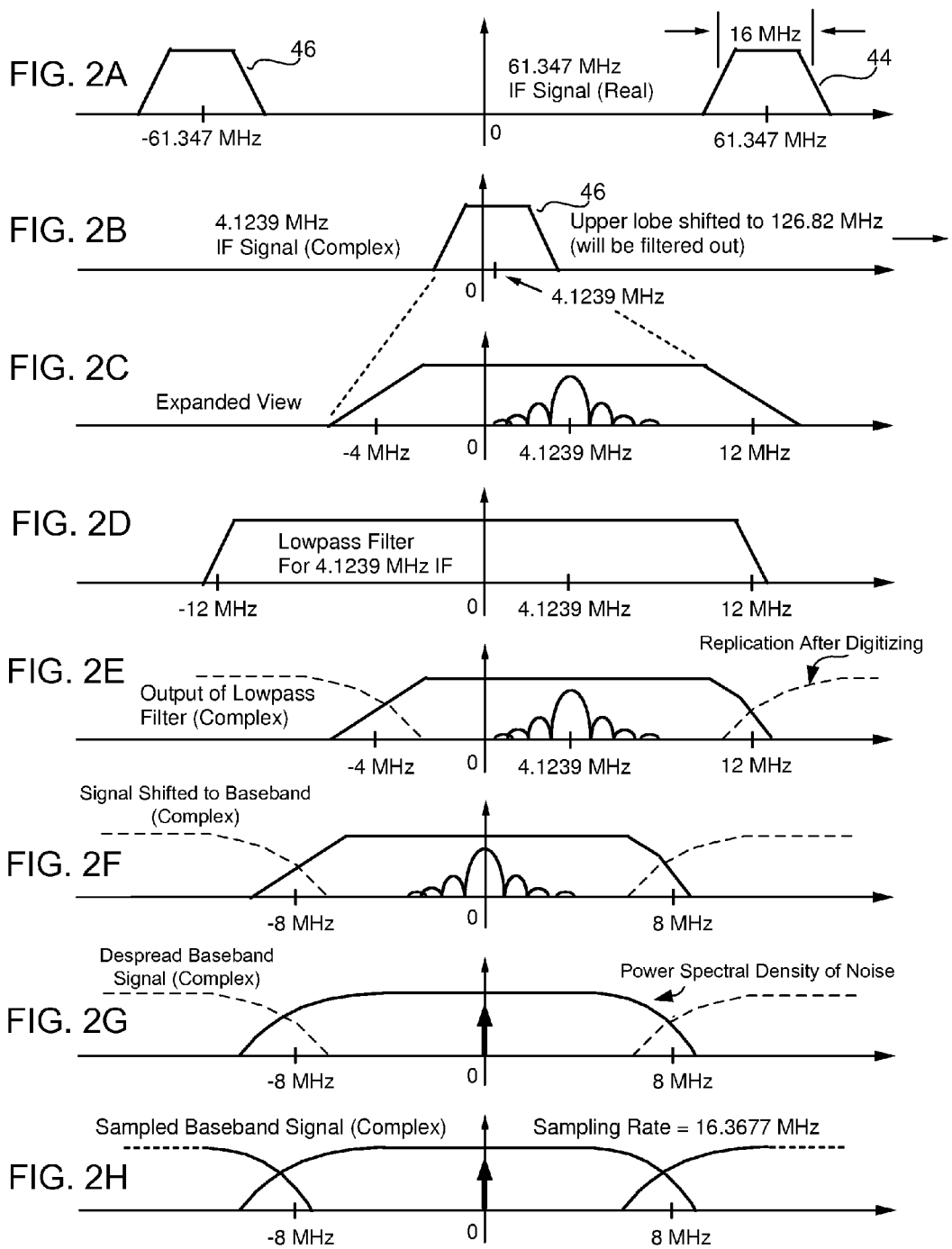
FIGS. 2A through 2H schematically illustrates a power spectra of the signal at various stages from a spectral density (PSD) of the 61.347 MHz IF input signal to the sampled baseband signal in accordance with one embodiment of the present invention.

FIG. 2A schematically illustrates the power spectral density (PSD) of the 61.347 MHz IF noise process containing satellite signals 21 as it emerges from the SAW band-pass filter 20 centered at 61.347 MHz (more precisely, 61.3468 MHz). At this point, the signal 21 is real-valued, so its power spectrum has conjugate symmetry about zero frequency, including an upper lobe 44 and a lower lobe 46 as shown in FIG. 2A. The bandwidth of the SAW filter 20 is 16 MHz (±8 MHz).

FIG. 2B schematically illustrates the output signal 28 (28a and 28b) from the second mixer 22. The 65.471 MHz complex LO2 signal 24 consists of I and Q square wave components 24a and 24b, which can be represented by the complex exponential waveform $e^{j\omega_0 t}$ plus a complex waveform containing only odd multiples of the LO2 radian frequency $\omega_0$. When mixed with the 61.347 MHz first IF signal 21, these odd multiples produce high-frequency output products which will be filtered out by the 12 MHz low-pass IF filters 30a and 30b following the second mixer 22. Thus, the effective LO2 signal is simply $e^{j\omega_0 t}$, which shifts the spectrum of the 61.347 MHz IF input 21 upward to produce the spectrum shown in FIG. 2B. The upper lobe 44 of this spectrum is shifted to 61.347+65.471=126.818 MHz, so it is also filtered out by the 12 MHz low-pass IF filters. The lower lobe 46 is shifted to a center frequency of 4.1239 MHz (i.e., −61.3468+65.4707), where it is passed by the low-pass filters 30a and 30b.

FIG. 2C is an expanded view of the spectrum of the second mixer output 28 prior to low-pass filtering by the LPF 30, and includes the spectrum of a satellite signal spread by the C/A code. The second mixer output (the second IF signal) 28 is a complex 4.1239 MHz IF signal (28a, 28b) with a passband extending from −4 MHz to 12 MHz. It should be noted that the passband is not symmetric about zero frequency, as it would be if the 4.1239 MHz second IF signal 28 were purely real. It should also be noted that the satellite signal is actually buried in noise and cannot be seen at this stage.

The complex 4.1239 MHz IF signal 28 as shown in FIG. 2C then passes through the I and Q low-pass filters 30a and 30b with a bandpass extending from −12 to 12 MHz. The transfer function magnitude of the low-pass filters 30a and 30b is shown in FIG. 2D. Because each of the low-pass filters 30a and 30b must produce a real output when its input is real, the bandpass region is symmetric about zero frequency. The IF signal at this point is centered at 4.1239 MHz. The 12 MHz cutoff frequency of the low-pass filters 30a and 30b was chosen in order to maintain a 16 MHz (+/−8 MHz) signal bandwidth. Note that the lower sidelobes of the spread-spectrum satellite signal extend 4 MHz below zero frequency as shown in FIG. 2C.

After passing through the low-pass filters 30a and 30b, the spectrum of the 4.1239 MHz signal 32 appears as shown in FIG. 2E. The passband now extends from −4 MHz to 12 MHz, a span of 16 MHz. The spectrum is not perfectly symmetric about the center frequency, because the roll-off characteristic at the low end is determined only by the 16 MHz wide SAW filter 20 centered at 61.347 MHz, but the upper end also includes the roll-off of the 12 MHz second IF low-pass filter 30. Computer simulations show that the asymmetry has negligible effect. The output signal 32 from the low-pass filter 30 is digitized at the analog/digital converter 34 with the sampling rate at $f_r \cong 16.3677$ MHz using the clock signal 15. The sampling and digitizing replicates the spectrum, and FIG. 2E also shows the replication after the sampling, as well as FIGS. 2F, 2G, and 2H. As shown in FIG. 1, the digitized signal 36 may be represented by 4 bits in accordance with one embodiment of the present invention. A smaller number of bits may also be used.

The second IF signal spectrum centered at 4.1239 MHz is now shifted to 31.9681 kHz by the third mixer (complex mixer) 38 shown in FIG. 1, and finally to baseband (FIG. 2F) by the phase rotator in the baseband processing section 70 (FIG. 4), which will be described later. FIG. 2F illustrates the baseband signal 112 (see FIG. 4), and the spectrum shown in FIG. 2F is the spectrum of the PN code, which has nulls at ±1.023 MHz, ±2.046 MHz, etc. Although the third mixer (complex mixer) 38 uses I and Q local oscillator square waves (LO3 from the LO3 logic 40), this causes no SNR loss because the relation of the subsequent signal sampling rate ($f_r \cong 16.3677$ MHz) to the LO3 frequency (16.3677/4=4.0919 MHz) produces the same result as if sinusoidal LO waveforms were used. Note that the passband of the signal (and noise) now extends from −8 MHz to 8 MHz, giving a lowpass cutoff frequency of 8 MHz.

FIG. 2G shows how the signal and noise spectrum of the baseband signal (FIG. 2F) is modified when the signal is despread during tracking. As shown in FIG. 2G, the signal now occupies a very narrow spectral region at zero frequency (shown by the bold impulse), while the noise component is spread slightly by the reference C/A code.

Because of the sampling at $f_r \cong 16.3677$ MHz, the spectra of FIGS. 2F, 2G, and 2H have replicas spaced 16.3677 MHz apart. Note that the non-aliased frequency range of the baseband signal is from slightly more than −8 MHz to slightly less than 8 MHz. Therefore the one-sided low-pass cutoff frequency is slightly less than 8 MHz.

Signal Splitter

Figure 3:
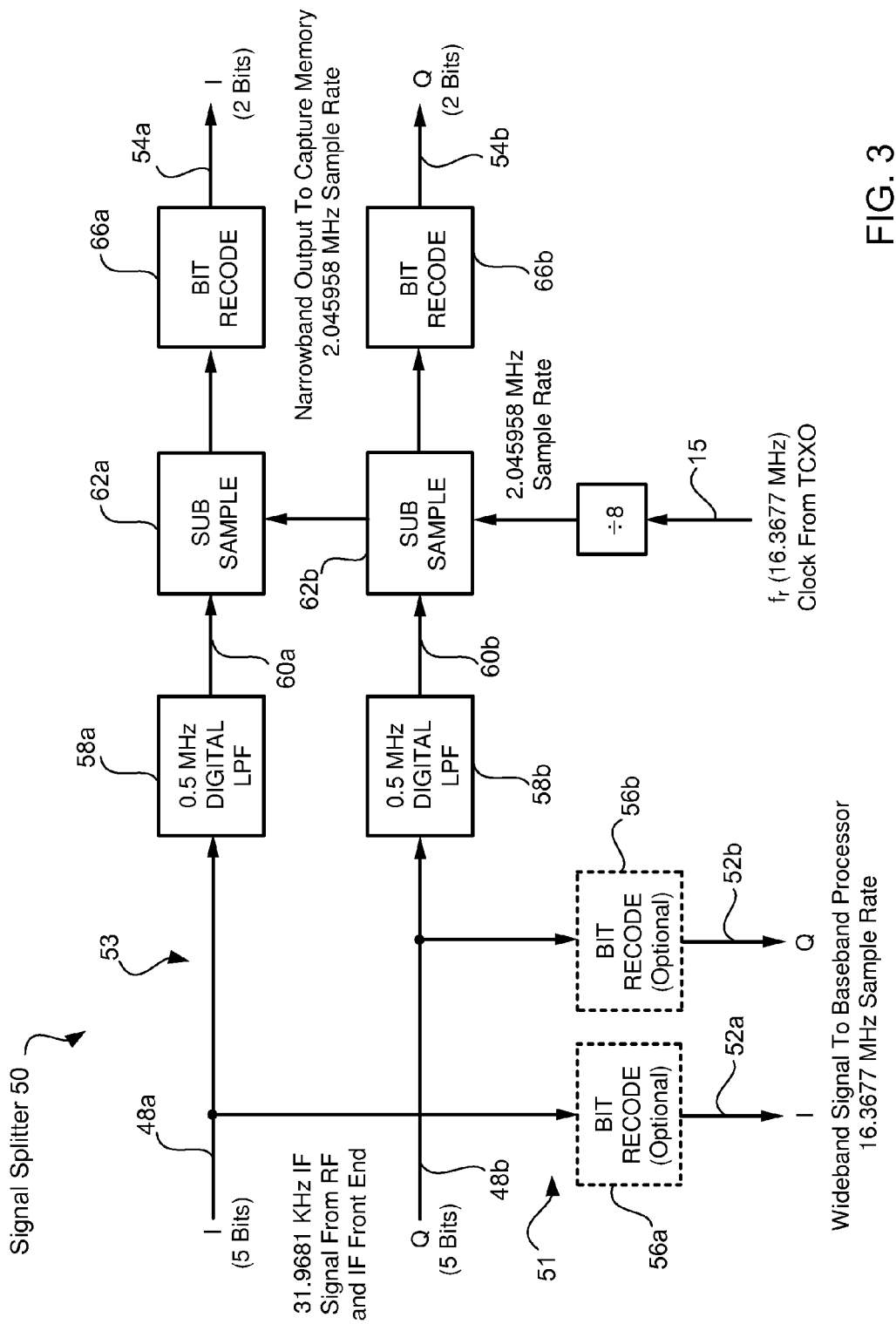
FIG. 3 is a schematic block diagram of the signal splitter in accordance with one embodiment of the present invention.

FIG. 3 is a block diagram of the signal splitter 50 in accordance with one embodiment of the present invention. Its purpose is to split the 31.9681 KHz IF signal 48 (I component 48a and Q component 48b) from the RF/IF front end section 10 into a high bandwidth (wideband signal) path 51 and a low bandwidth (narrowband signal) path 53. The high bandwidth signal 52 (52a, 52b) is simply the 31.9681 KHz IF signal 48 (48a, 48b) itself which is passed on to the baseband processor 70 (see FIG. 4). However, if desired, it can be bit recoded from 5 bits to 2 bits by the bit encoders 56 as shown in the FIG. 3 to reduce hardware complexity and cost in the baseband processor. The high bandwidth signal 52 is used for tracking and positioning.

The low bandwidth signal 54 (54a, 54b) is formed by passing the I and Q components 48a and 48b of the RF/IF front end output through digital low-pass filters 58a and 58b with a cutoff frequency of 0.5 MHz, sub-sampling the filter outputs 60a and 60b at $f_r/8 \cong 2.045958$ MHz at the sub-samplers 62a and 62b, and then bit recoding down to 2 bits by the bit recoders 66a and 66b. The design of such filters is well known in the art, so further details are omitted. The filter can be either a finite impulse response (FIR) type or an infinite impulse response (IIR) type. An adequate filter would be a four pole Butterworth low-pass IIR filter. Since the sampling rate of $f_r \cong 16.3677$ MHz is about 32 times the filter cutoff frequency, the stopband of the filters 58a and 58b is not degraded by aliasing. The bit-recoded I and Q components 54a and 54b from the filter outputs 60a and 60b are passed to the signal capture memory to be used in searching for and acquiring satellite signals. Because the bandwidth (±0.5 MHz, total 1 MHz), sampling rate (P8, instead of f), and number of bits per sample (2 bits, instead of 5 bits) of the signal have been made small, the signal capture memory size can be minimized, thus reducing cost.

It is possible to reduce the capture memory size even further by reducing the subsampling rate at the sub-samplers 62a and 62b to $f_r/16 \cong 1.02298$ MHz, which is the lowest rate at which significant aliasing will not occur. However, it somewhat complicates the process of accurately locating the delay and Doppler of the signals in the capture memory when they are acquired, since better interpolative techniques would generally be required.

Although the center frequency of the signal stored in the capture memory is 31.9681 kHz, this is not a problem because when the capture memory is accessed during satellite acquisition search, Doppler compensation must occur at a number of search frequencies, and the compensation can include compensation for the 31.9681 kHz offset.

The process of acquiring the signals in the capture memory is not part of this invention and may be performed using well-known technology. Further explanation of the signal acquisition process is therefore omitted.

It should be realized that the signal splitter 50 permits the receiver to track high-bandwidth signals 52a and 52b at the same time that it is storing low-bandwidth signals 54a and 54b in an economical capture memory or acquiring them after they have been stored. Thus, acquisition or re-acquisition of satellites will not interrupt the tracking of satellites that are currently being tracked. Furthermore, the acquisition process is not degraded because good acquisition performance (high sensitivity and small TTFF) does not require a high-bandwidth signal and is usually not degraded significantly by multipath interference.

It should also be realized that the lowpass filters 58a and 58b in the signal splitter 50 have a video bandwidth equivalent to an RF bandwidth of 1 MHz, approximately half that of many existing low-cost receivers. Although this is narrower than the 2 MHz first null-to-first null bandwidth of the GPS $L_1$ signal, the resulting reduction in signal power is only 0.7 dB, a small price to pay for being able to reduce the size of the capture memory by a factor of 2. If desired, the loss can be removed by increasing the time length of the capture memory by a small fraction.

Baseband Processor

Figure 4:
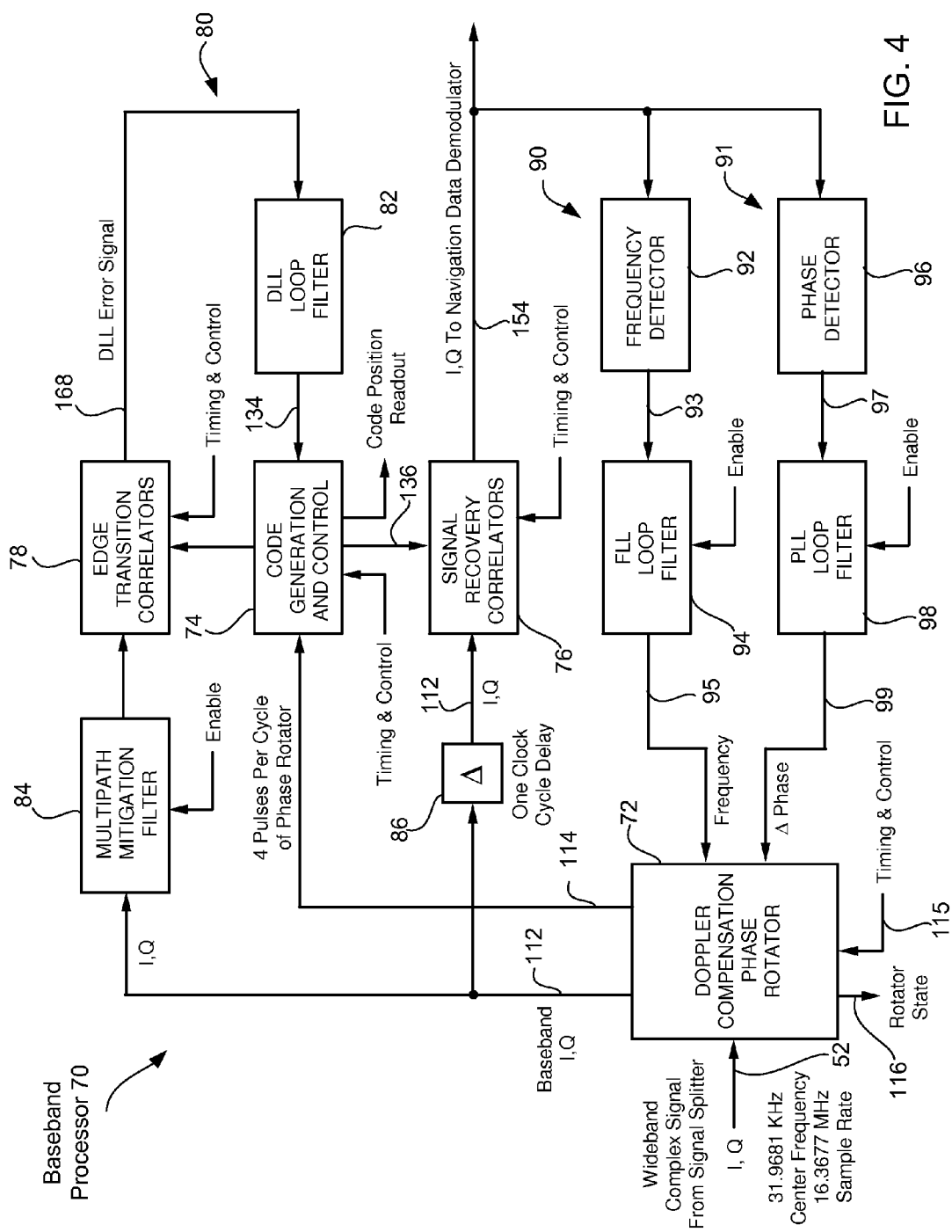
FIG. 4 is a schematic block diagram of the baseband processor in accordance with one embodiment of the present invention.

FIG. 4 is a block diagram of the baseband processor 70 in accordance with one embodiment of the present invention. Unlike the RF/IF section 10 and the signal splitter 50, the baseband processor 70 is replicated for each satellite signal processed, since the PN code is unique to each satellite. The primary purposes of the baseband processor are to Doppler compensate the signal down to baseband, track the signal carrier and PN code, and obtain processing gain through correlation so that further operations are possible, such as navigation bit synchronization and demodulation. It also performs multipath mitigation. The main components of the baseband processor 70 are a Doppler compensation phase rotator 72, a reference PN code generation and control 74, signal recovery correlators 76, edge transition PN code tracking correlators 78, a DLL PN code tracking loop 80 including DLL loop filter 82, multipath mitigation filters 84, as well as special concurrently operating FLL and PLL carrier tracking loops 90 and 91. The FLL carrier tracking loop 90 includes a frequency detector 92, and an FLL loop filter 94, and the PLL tracking loop 91 includes a phase detector 96 and a PLL loop filter 98, as shown in FIG. 4. These components will now be discussed in more detail.

Doppler Compensation Phase Rotator

Figure 5:
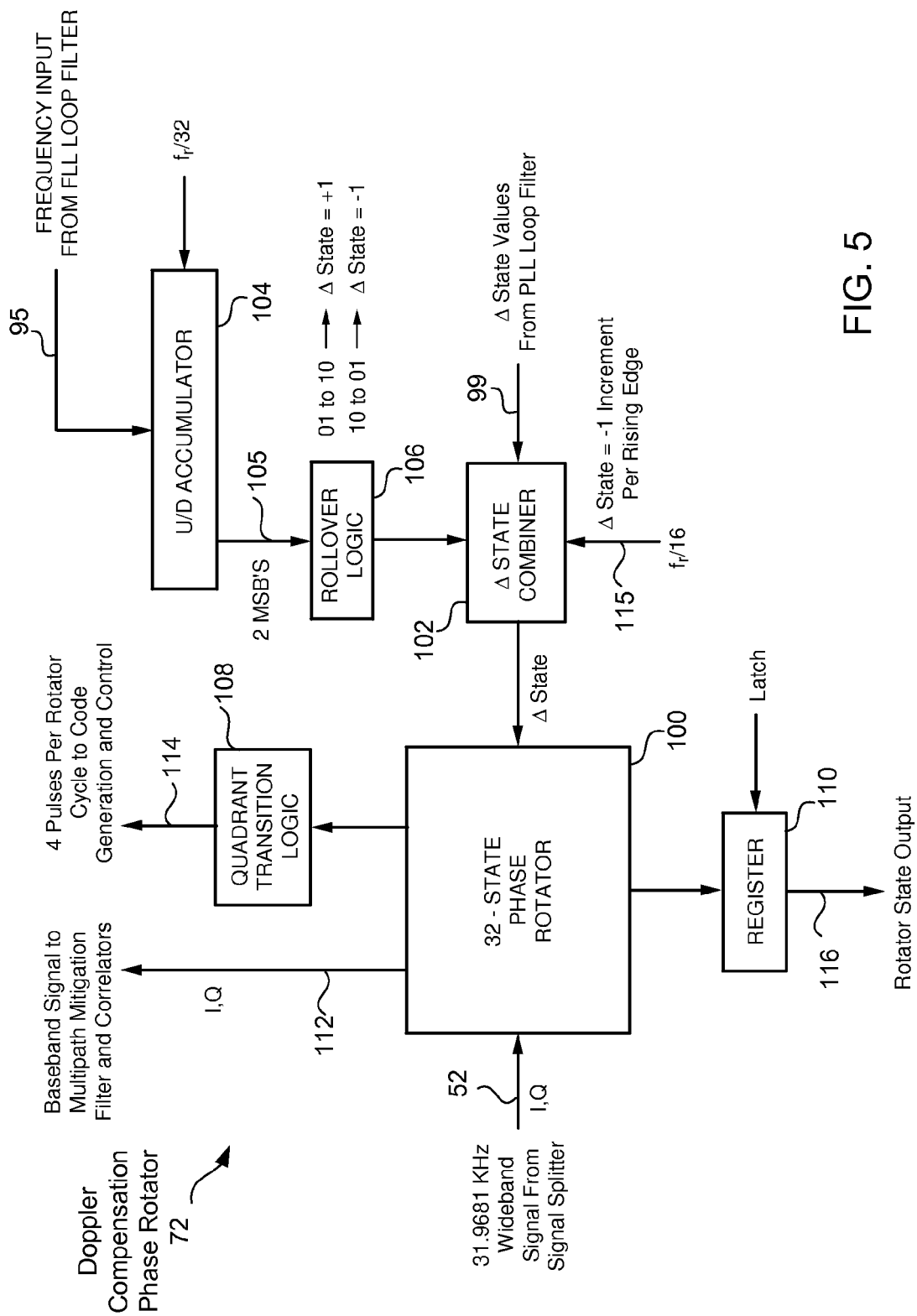
FIG. 5 is a schematic block diagram of the Doppler compensation phase rotator in accordance with one embodiment of the present invention.

The wideband complex-valued signal 52 with center frequency 31.9681 KHz from the signal splitter 50 (see FIG. 3) enters the baseband processor 70 via a Doppler compensation phase rotator 72 which shifts the center frequency to zero. FIG. 5 is a block diagram of the Doppler compensation phase rotator 72 in accordance with one embodiment of the present invention. The Doppler compensation phase rotator 72 has 32 states, or phase angles, separated by 360/32=11.25 degrees. The Doppler compensation phase rotator 72 includes a 32-state phase rotator 100, a Δ-state combiner 102, an up/down (U/D) accumulator 104, rollover logic 106, quadrant transition logic 108, and a register 110. The phase rotator inputs which can change its state are a $f_r/16 \cong 1.02298$ MHz clock 115, a frequency input 95 from a FLL loop filter 94, and Δ-state values 99 from a PLL loop filter 98. Each rising edge of the $f_r/16$ clock 115 produces a −1Δ-state value for the phase rotator 100. A negative Δ-state value causes the rotator 100 to advance in a clockwise direction, which represents a phase retardation. The FLL frequency input 95 is accumulated by the U/D accumulator 104 clocked at $f_r/32 \cong 511.489.62$ KHz, although other rates might be used.

The 2 most significant bits (MSB's) of the accumulator output 105 are fed through the simple rollover logic 106. The rollover logic 106 produces a+1Δ-state value if the 2 MSB's roll from 01 to 10, and a −1Δ-state value when the 2 MSB's roll in the other direction from 10 to 01. Thus, a positive frequency input to the U/D counter 104 causes a counterclockwise rotation of the phase rotator 100 and increases the frequency of the rotator output in at positive direction. The Δ-state values from all three sources pass through the Δ-state combiner 102 which increments the state of the phase rotator 100 by the sum of all the Δ-state values at the combiner input.

The number of bits N (not including sign) in the U/D accumulator 104 depends on the frequency resolution desired. For example, a reasonable frequency resolution is 0.1 Hz. Assuming an accumulator clocking rate of $f_r/32$ and the 32-state phase rotator, the value of N can be determined as the smallest positive integer for which $$\frac{f_r/32}{2^N \times 32} \le 0.1$$

which in this case is 18. Thus, the U/D accumulator 104 would have 19 bits including the sign bit, and the approximate frequency range would be $\pm 0.1 \times 2^{18} = \pm 26{,}214.4$ Hz, more than enough to span the combination of satellite/receiver-induced signal Doppler shift and frequency tolerance of a low-cost TCXO reference oscillator.

In order to facilitate understanding of the phase rotator operation, the notion of receiver time and apparent Doppler will now be introduced. "Receiver time" defines one second as the interval during which the TCXO reference oscillator 12 produces exactly $f_r$ cycles, where $f_r$ is the design frequency of the oscillator 12 and not the actual frequency which may deviate slightly from the design frequency. "Apparent Doppler" of the signal is the Doppler observed referenced to receiver time. Thus, nonzero apparent Doppler can be caused not only by motion of the satellites and the receiver, but by deviation of the TCXO reference oscillator 12 from its design value. In the following discussion, time will always be receiver time, frequencies will always be referenced to receiver time, and Doppler will always be apparent Doppler.

If the 1575.42 MHz GPS signal (the input RF signal 13) has zero Doppler, the center frequency of the phase rotator input signal 52 is exactly at $f_r/512 \cong 31.9681$ KHz. Under these conditions the design is such that if the inputs 95 and 99 from the FLL and PLL loop filters 94 and 98, respectively, are zero, then the rotator 72 will be rotating at $-(f_r/16)/32 = -f_r/512$ Hz (a clockwise phasor rotation), thus shifting the input signal frequency to exactly 0 Hz at the phase rotator signal output (baseband signal) 112. When the input signal 52 has nonzero Doppler, the FLL and PLL carrier tracking loops 90 and 91 will respectively feed frequency and phase values 95 and 99 to the phase rotator 72 which will produce a nominally zero Doppler output signal 112 containing a noise component.

As shown in FIG. 4, the phase rotator signal output (baseband signal) 112 is fed to I and Q edge-transition PN code tracking correlators 78 via switchable multipath mitigation filters 84, and also to I and Q signal recovery correlators 76 via a 1 clock cycle delay 86 ($1/f_r$ seconds) to match the 1 clock cycle delay in the multipath mitigation filters 84.

Quadrant transition logic 108 provides an output pulse 114 from the phase rotator 100 every time its state passes through 0, 90, 180, or 270 degrees (states 0, 8, 16, or 24), as shown in FIG. 5. As shown in FIG. 4, the pulses 114 are fed to the reference PN code generation and control circuitry 74 where they provide DLL rate-aiding, to be explained later. The polarity of the pulses 114 is positive if the rotation is clockwise through the quadrant boundaries and negative if the rotation is counterclockwise.

The state of the rotator (rotator state) 116 is always available in a register 110 which can be read by a command from software. Knowledge of the rotator states at periodic intervals enables the receiver to accurately determine how many carrier cycles of Doppler have occurred over time. This information is used to determine accurate receiver velocity and integrated Doppler.

Reference PN Code Generation and Control

Figure 6:
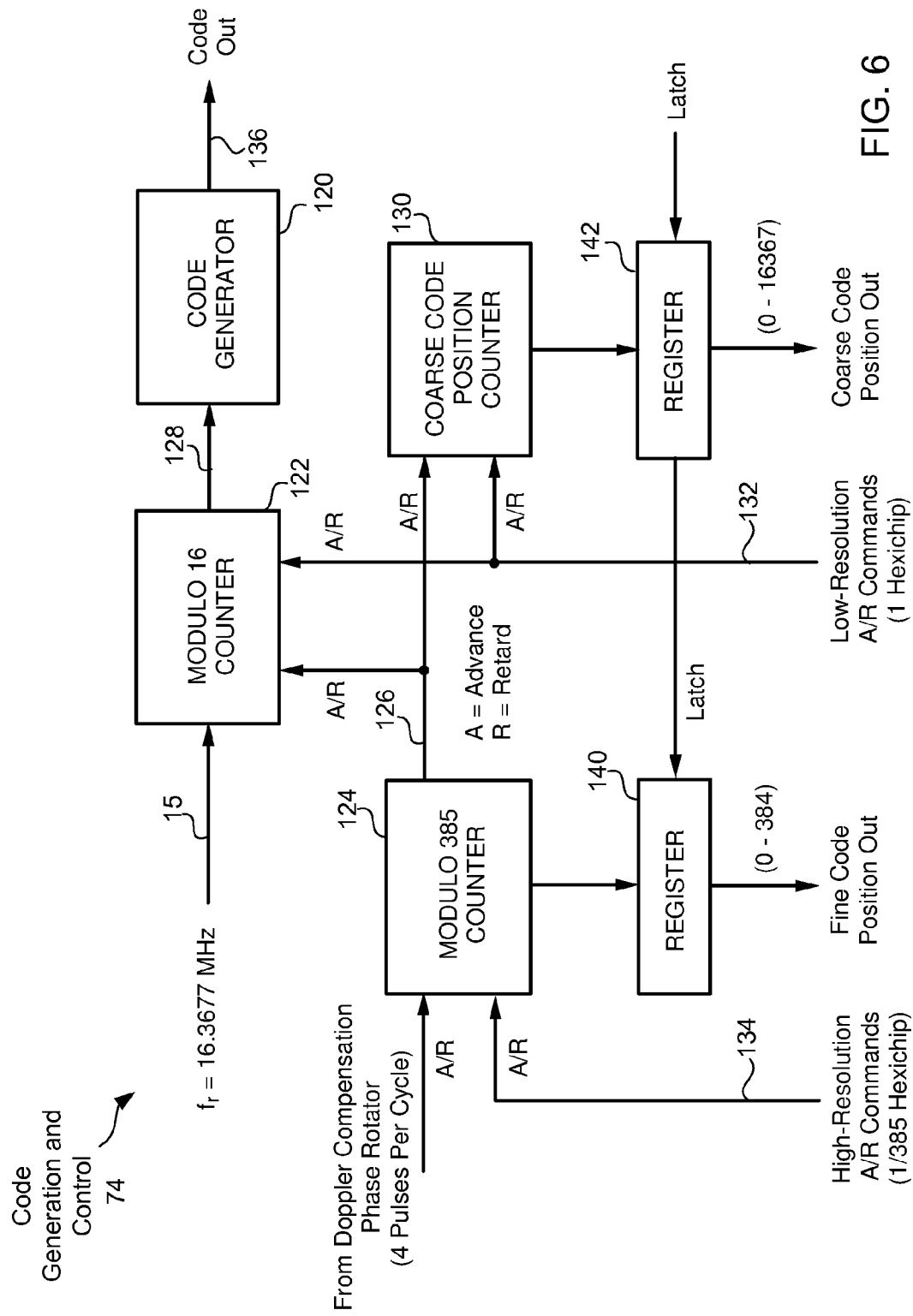
FIG. 6 is a schematic block diagram showing the reference PN code generation and control circuitry in accordance with one embodiment of the present invention.

FIG. 6 is a block diagram showing the reference PN code generation and control circuitry 74 and its method of control in accordance with one embodiment of the present invention. The reference PN code generation and control circuitry 74 includes a code generator 120 which is clocked by passing the TCXO reference frequency $f_r \cong 16.3677$ MHz through a free running modulo 16 counter 122 that nominally divides the frequency by 16, but which upon an advance command (A) can move forward 1 count or upon a retard command (R) can move backward 1 one count. A one count advance or retard corresponds to an advance or retard of one hexichip (1/16 chip) in the code generator 120. If no A/R commands were being received by the modulo 16 counter 122, the chipping rate of the output code 136 from the code generator 120 would be $f_r/16 \cong 1.022979241$ MHz, which is slightly slower than the 1.023 MHz zero Doppler chipping rate of a GPS C/A code.

However, rollover pulses from a modulo 385 counter 124 shown in FIG. 6 provide a continuous stream of AIR commands 126 to the modulo 16 counter 122, which speeds up the chipping rate of the code generator 120 to exactly match the effects of Doppler on the received signal. To clarify its operation, as shown in FIG. 5, we note that the $f_r/16$ clock 115, the FLL frequency input 95, and the PLL Δ-state values 99 into the phase rotator 100 from the carrier tracking loops will cause it to rotate clockwise at $f_r/512+f_d$ rotations per second, where $f_d$ is the Doppler shift in Hz. There will then be on the average $4\times(f_r/512+f_d)=f_r/128+4f_d$ positive pulses per second at the quadrant transition logic output 114. Each of these pulses advances the modulo 385 counter 124 by one count, so the average rate of the counter rollover pulses is $(f_r/128+4f_d)/385$. Since each positive rollover pulse advances the modulo 16 counter 122 by one count, the overall average counting rate of the modulo 16 counter 122 will be:

$$f_r + (f_r/128 + 4f_d)/385 = (49281/49280)f_r + (r/385)f_d$$
$$= (49281/49280)[(16)(49280/49821)$$
$$(1.023 \times 10^6)] + (4/385)f_d$$
$$= (16)(1.023 \times 10^6) + (4/385)f_d \text{ Hz}$$

The code generator chipping rate will be 1/16 of this value, or $1.023\times10^6+f_d/1540$ chips per second. This rate will exactly match the apparent chipping rate of the received signal, since there are exactly 1540 carrier cycles per C/A code chip.

The state of the receiver-generated code at any moment in time can be read by simultaneously reading the state of the modulo 385 counter 124 (from a register 140) and the state of a modulo 1023×16=16368 coarse code position counter 130 (from a register 142) shown in FIG. 6, which receives A/R commands 126 from the rollover output of the modulo 385 counter 124. At receiver startup the code generator 120, the modulo 16 counter 122, the modulo 385 counter 124, and the coarse code position counter 130 are initialized to their zero states, and the state of the receiver-generated code is determined by keeping track of accumulated A/R commands in the registers 140 and 142.

Although the modulo 16 counter 122 permits the code to be time-shifted in only one-hexichip increments, the modulo 385 counter 124 can control when these time shifts occur. This has the effect of controlling the average receiver-generated code position relative to the received code with very high resolution. During tracking of the received code, its state in coarse (1 hexichip) resolution is estimated by the output of the coarse code position counter 130, which is refined to high-resolution by the output of the modulo 385 counter 124. The resulting resolution is 1/385 of a hexichip, or about 4.8 centimeters. A high-resolution estimate of the state of the received code at any given time can be determined from the formula:

Received code state (hexichips)≅coarse code position counter output+(mod 385 counter output−385/2)
1385

FIG. 6 also shows additional externally generated low- and high-resolution A/R input commands 132 and 134. The low-resolution 1 hexichip commands 132 are applied to the modulo 16 counter 122 from software for the purpose of rapidly moving the code to the approximate position computed during satellite signal acquisition so that code tracking can be initiated. The high-resolution 1/385 hexichip commands 134 are applied to the modulo 385 counter 124 from the code tracking DLL 80 (see FIG. 4) to keep the received and receiver-generated codes accurately time-aligned through fine adjustments.

From the above discussion it can be seen that the carrier tracking loops (FLL and PLL) 90 and 91 control the chipping rate of the receiver-generated code so that it accurately matches that of the received code, regardless of Doppler. This process is called code rate aiding. Because carrier tracking is inherently very accurate and can respond quickly to changes in Doppler due to satellite and receiver accelerations, it reduces stress on the code tracking DLL 80. Consequently, the code tracking DLL 80 can maintain code time-alignment using a very small bandwidth to reduce noise without sacrificing the ability of the receiver to handle dynamics.

Signal Recovery Correlators

Figure 7:
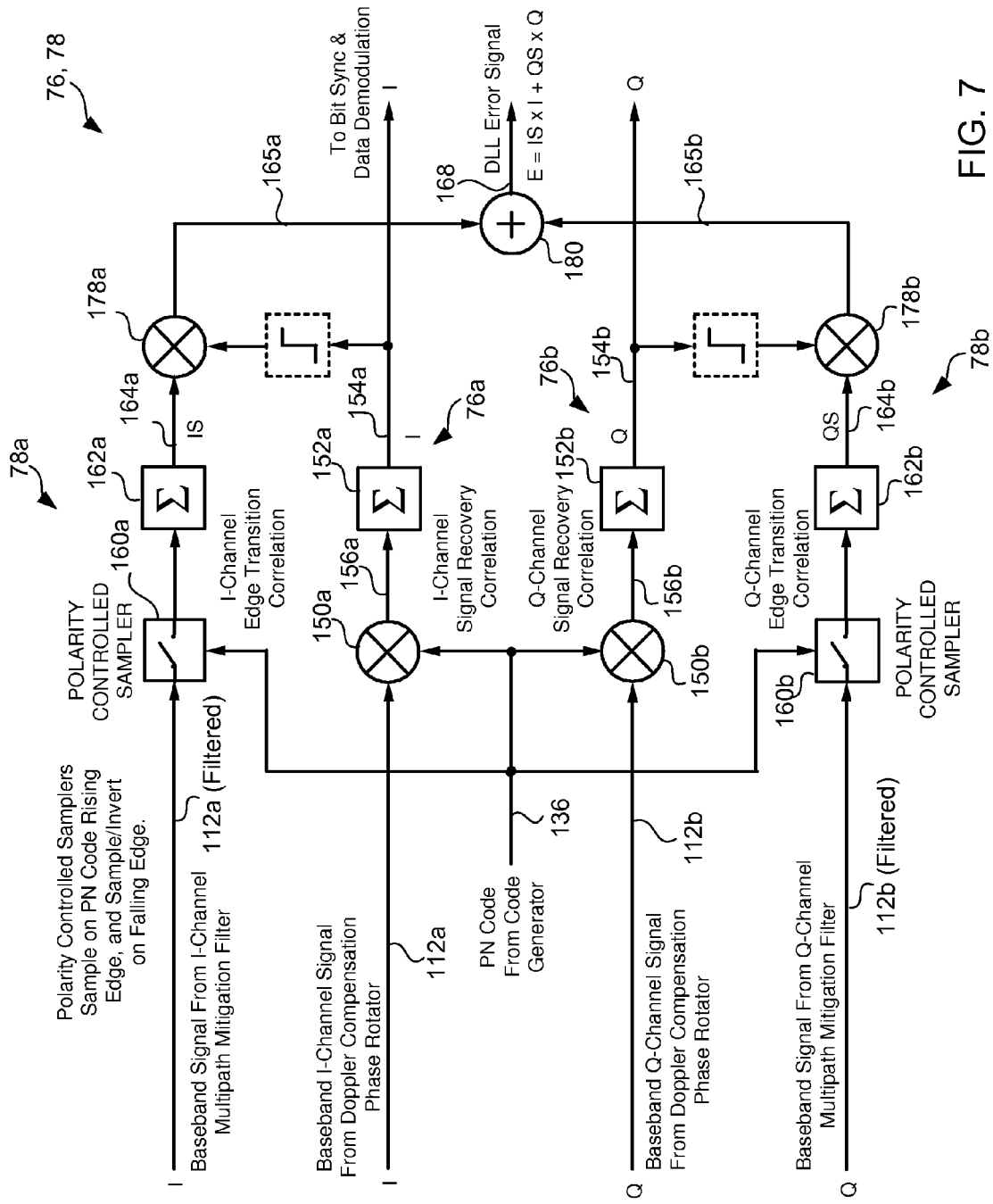
FIG. 7 is a schematic block diagram illustrating the signal recovery correlators and edge-transition PN code tracking correlators for the I-channel and the Q-channel in accordance with one embodiment of the present invention.

FIG. 7 shows the signal recovery correlators 76 (76a and 76b), one for the I-channel and one for the Q-channel in accordance with one embodiment of the present invention. These correlators 76a and 76b are of conventional design in which the received baseband I and Q-channel signals 112a and 112b are each multiplied by samples of the receiver-generated PN code 136 at a rate of $f_r \cong 16.3677$ MHz by respective mixers 150a and 150b. The resulting products are summed in I and Q accumulators (also referred to as "averagers") 152a and 152b during the 20 millisecond period of each GPS navigation data bit (embodiments of the FLL described later require either two 10-millisecond accumulations or five 4-millisecond accumulations during each data bit, but in either case a 20 millisecond signal recovery accumulation can be obtained by summing the individual accumulations within the data bit). At the end of each bit period the contents of the accumulators 152a and 152b are read, forming numbers 154a and 154b (denoted by I and Q) at the accumulator outputs in FIG. 7, and the accumulators 152a and 152b are reset to zero to begin accumulation during the next bit period. Thus, updates occur every 20 milliseconds.

Figure 8:
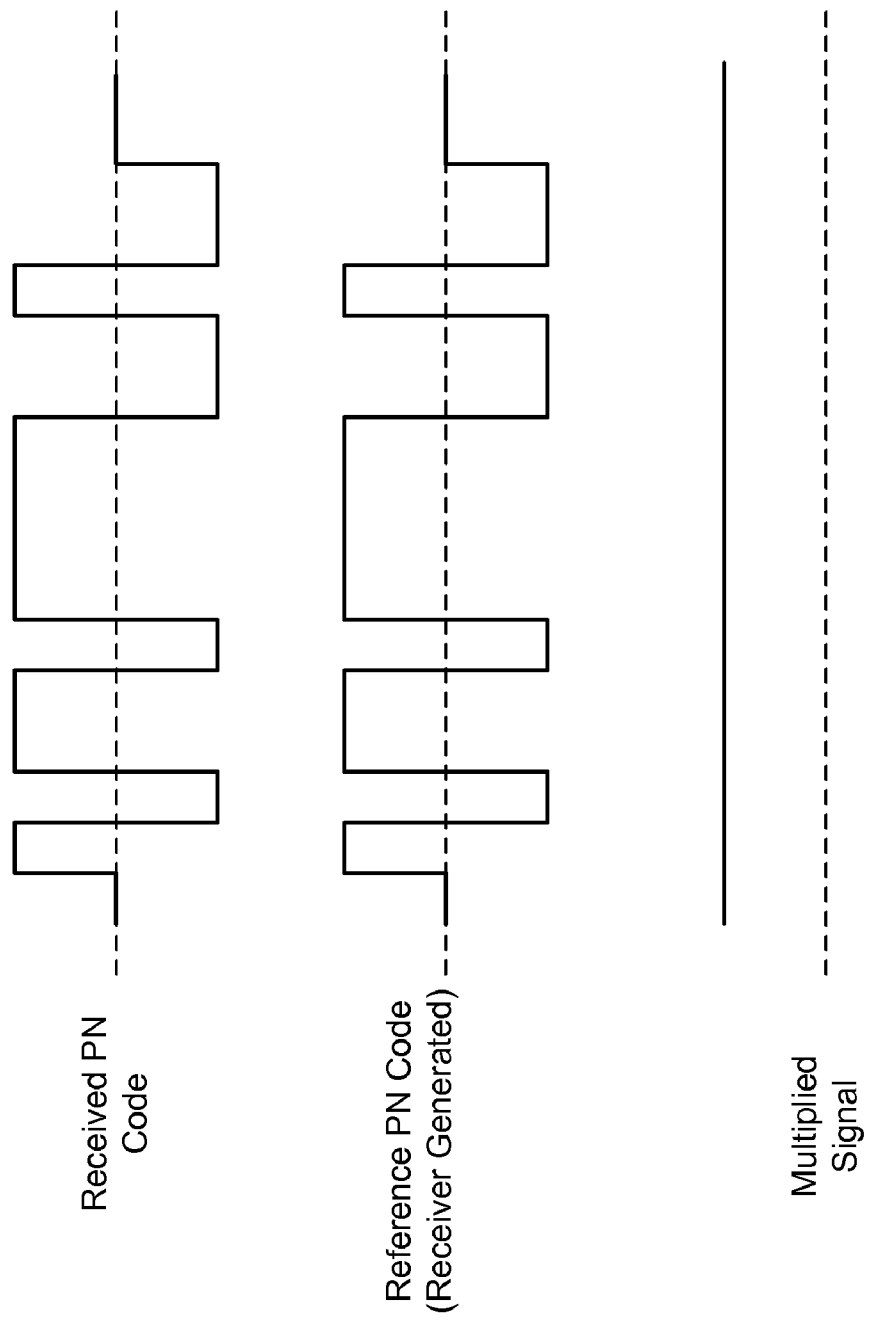
FIG. 8 schematically illustrates the signal recovery correlation process when the received PN code signal and the reference PN code signal are aligned.

FIG. 8 schematically illustrates the signal recovery correlation process when the received PN code signal (i.e., the baseband signal 112 (with noises) as shown in FIG. 2F) and the reference PN code signal 136 are aligned. The received PN code signal and the reference PN code signal are multiplied by the mixer 150. The resulting signal 156 is a constant voltage (DC signal) since the received PN code signal 112 (except noises) and the reference PN code signal always have the same polarity. The spectrum of the resulting constant voltage is a spike in a frequency space as shown in FIG. 2G. This correlation operation is also referred to as "dispreading" since the wider spectrum of the baseband signal 112 in FIG. 2F is now extremely narrow in FIG. 2G. On the other hand, the noise pattern in the baseband signal 112 is basically random and thus its polarity also randomly changes. By averaging the multiplied signal over a certain period of time, the noises are averaged out to substantially zero, while the multiplied (i.e., correlated) PN code signal is output as a zero-frequency (DC) signal. Thus, the operation of the accumulators 152 is also considered as low-pass filtering to remove high frequency noises. It should be noted that FIG. 2G shows the signal before the averaging.

If the received PN code signal 112 and the reference PN code signal 136 are not aligned (i.e., shifted each other by more than 1 chip), no signal is output from the accumulator (averager) 152. By shifting the reference code and repeating the signal recovery correlation process, the alignment of the received PN code and the reference code is found at the maximum output. This signal alignment process in general is well known in the art. The I and Q outputs 154a and 154b of the accumulators 152a and 152b are used in the formation the DLL, PLL, and FLL tracking error signals (described below), and are also used for other processes, such as navigation data bit synchronization, data demodulation, and estimation of SNR. These additional processes are not the focus of the present invention, so their description is omitted.

Even if the received PN code and the reference PN code are aligned by the initial signal alignment process, it is necessary to keep the PN code signals aligned since the Doppler shift changes as the satellite moves. The satellite motion also causes the carrier frequency change which results in a non-zero baseband frequency. Accordingly, the GPS receivers need to keep tracking both the PN code position and the carrier frequency in order to maintain the alignment.

Edge Transition PN Code Tracking Correlators and DLL

Figure 9A:
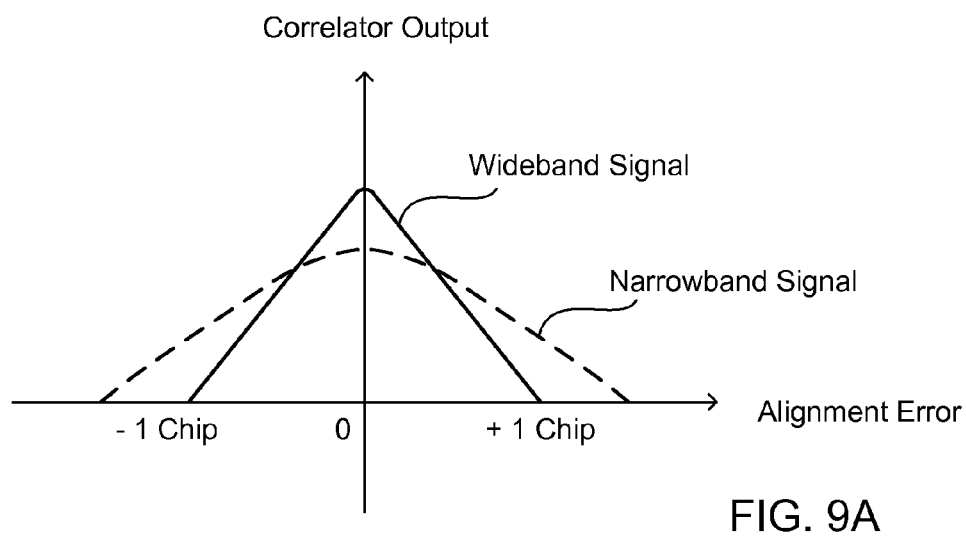
FIG. 9A is a diagram schematically illustrating a correlator output with respect to the alignment error within ±1 chip.
Figure 9B:
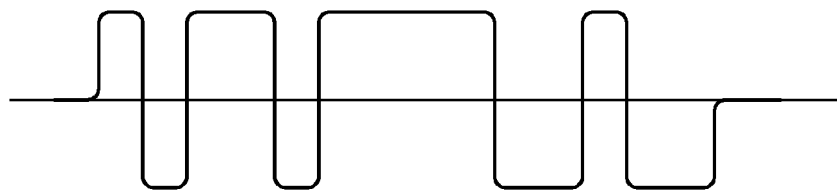
FIG. 9B is a diagram schematically illustrating an example of the waveform of the received PN code in a wideband signal.
Figure 9C:
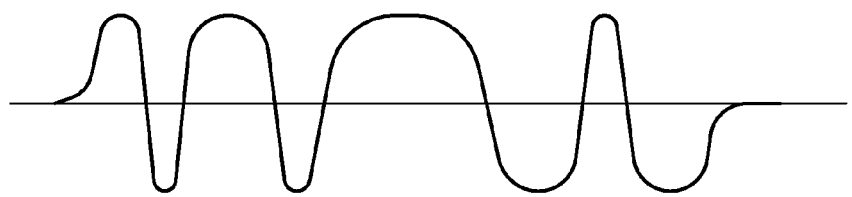
FIG. 9C is a diagram schematically illustrating an example of the waveform of the received PN code in a narrowband signal.

The magnitude of the output of the signal recovery correlator 76 indicates how well the received PN code and the reference PN code are aligned. FIG. 9A schematically illustrates a signal recovery correlator output with respect to the alignment error within ±1 chip. If the alignment error between the received PN code and the reference PN code is greater than one chip, the correlator output is substantially zero. Thus, it is assumed that a coarse alignment (the signal acquisition) has been done such that the received PN code and the reference PN code are aligned within an error of 1 chip. The correlator output has a generally triangular shape having a peak at the zero alignment error. The correlator output may also be referred to as a correlation value or an alignment value. If a wideband signal is used for the signal recovery correlation, the received PN code signal will have a nearly perfect waveform as shown in FIG. 9B, and the correlator output will have a nearly perfect triangular shape, as shown in FIG. 9A. However, in conventional low-cost GPS/GNSS receivers, the waveform of the received PN code signal may be deteriorated and have more round edges, as shown in FIG. 9C. As a result, the correlator output in such low-cost GPS/GNSS receiver has a hill-like shape as shown in FIG. 9A. However, the embodiments of the present invention use a wideband signal in the signal recovery correlation for the code tracking.

Figure 10:
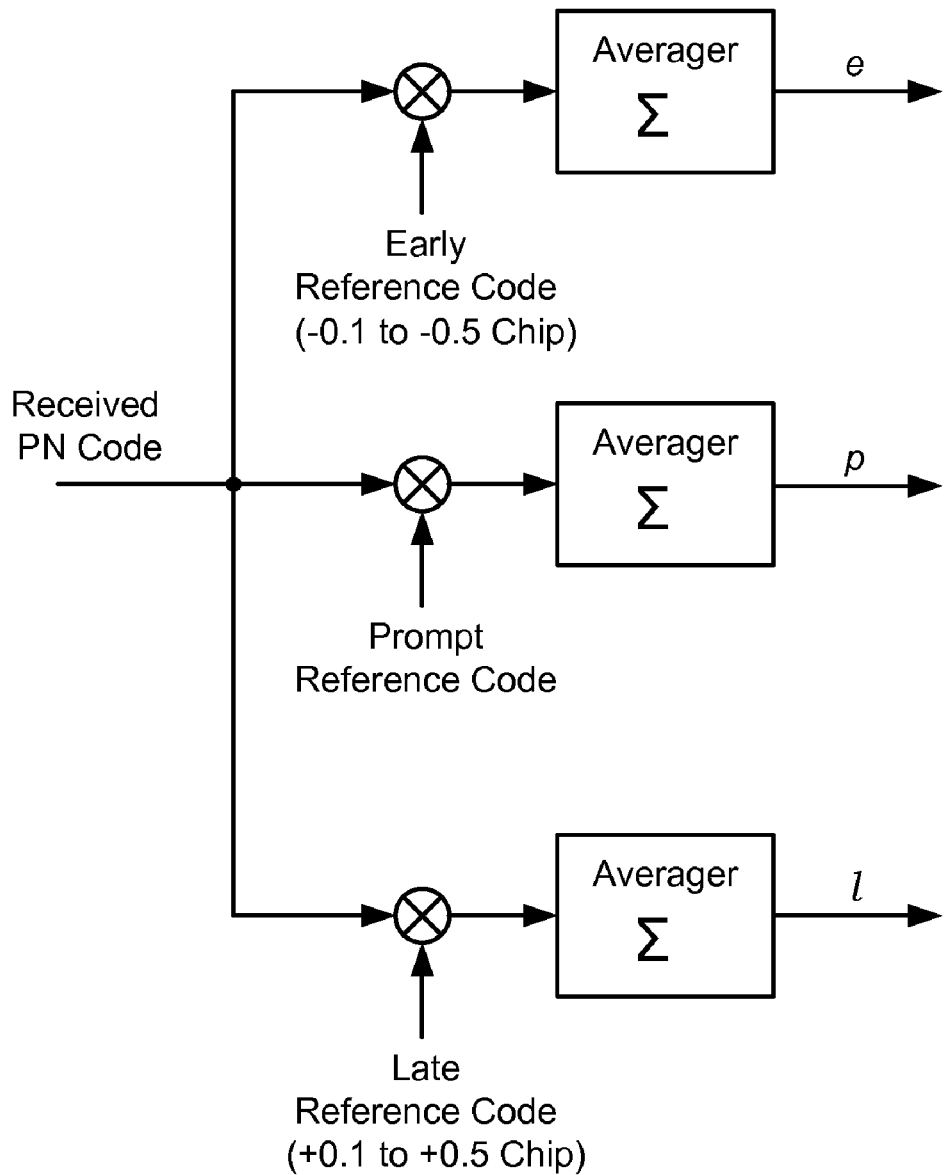
FIG. 10 is a diagram schematically illustrating conventional early, prompt, and late correlators.

Since misalignments in either direction (early or late) can produce the same correlation value, the correlation value itself cannot determine the direction of the actual misalignment. Therefore, conventionally, the receiver-generated PN code (prompt reference code) is slightly displaced in the negative direction (typically a −0.1 to −0.5 chip shift) to generate an early reference code, and is also slightly displaced the same amount in the positive direction (typically a+0.1 to +0.5 chip shift) to generate a late reference code. If the prompt reference code is shifted, the early reference code and the late reference code are also shifted keeping the same displacement. Then, three correlation values e, p, and l are obtained by multiplying the early, prompt (original), and late reference code signals with the received PN code signal, respectively. FIG. 10 schematically illustrates conventional early, prompt, and late correlators.

If the receiver-generated prompt PN code is exactly aligned with the received PN code, the correlation output p1 of the prompt reference code has the maximum value, and the correlation value e1 with the early reference code ("early correlation value") and the correlation value l1 with the late reference code ("late correlation value") are the same, as shown in FIG. 11A. If the receiver-generated prompt PN code is earlier than the received PN code (output value p2), the early correlation value e2 is greater than the late correlation value l2, as shown in FIG. 11A. Thus, the difference between the early correlation value e and the late correlation value l has a positive value. Similarly, if the receiver-generated prompt PN code (prompt reference code) is behind the received PN code, the early correlation value is smaller than the late correlation value (not shown), and thus the difference between the early correlation value e and the late correlation value l has a negative value. Thus, the difference ($\Delta_{dsc}$) between the early correlation value e and the late correlation value l, which is referred to as a discriminator function, is used to indicate the magnitude and direction of the misalignment. An example of the discriminator function is illustrated in FIG. 11B. It should be noted that in the case of a narrowband signal, which waveform is rounded, the discriminator output is weak and the curve of the discriminator function is more relaxed as shown in FIG. 11B. The correlator/discriminator output ($\Delta_{dsc}$=e−l) is used in a conventional delay lock loop to control the code generator to shift the alignment, and the prompt reference code is used for the positioning in measuring the delay in the received signal.

In the "narrow correlator" approach, the early reference code and the late reference code are closer to the prompt reference code, and apart from the prompt reference code by 0.1 chip, for example, in order to use stronger signal portion of the correlator output.

On the other hand, embodiments of the present invention use edge transition correlators instead of conventional early code/late code correlators. The edge transition PN code tracking correlators 78 (78a, 78b) are shown in FIG. 7, one for the I-channel and one for the Q-channel. Unlike the early code/late code correlators found in typical GPS receivers, as discussed above, the edge transition PN code tracking correlators 78a and 78b are polarity-controlled sampling correlators which track more accurately than even narrow correlators. Only the operation of the I-channel correlator 78a will be described, since operation of the Q-channel correlator 78b is similar and is understood by those of ordinary skill in the without further explanation.

The baseband signal 112a from the I-channel Doppler compensation phase rotator 72 previously described is sampled by a polarity-controlled sampler 160a. The baseband signal 112a optionally may have been filtered by the multipath mitigation filter 84 in FIG. 4. The sampling time points and polarity control are generated from the receiver-generated PN code (prompt reference code) 136, and samples can only be taken at chip boundaries of this code. A baseband signal sample is taken on each receiver-generated PN code rising edge, and a polarity-inverted sample is taken on each receiver-generated PN code falling edge. No sample is taken at chip boundaries where there is no change of polarity. Normally the sample values are summed in an accumulator (averager) 162a during the period of each GPS navigation data bit (20 milliseconds), however shorter periods of accumulation are possible. At the end of each bit period the contents of the accumulator 162a are read, forming a number 164a (denoted by IS) in FIG. 7, and the accumulator 162a is reset to zero to begin accumulation during the next bit period. Thus, the number 164a (IS) is updated every 20 milliseconds.

Figure 12A:
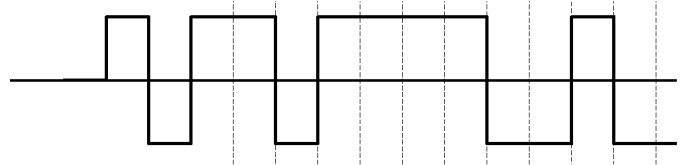
FIGS. 12A-12E are diagrams explaining the polarity-controlled PN code sampling in accordance with one embodiment of the present invention.
Figure 12B:
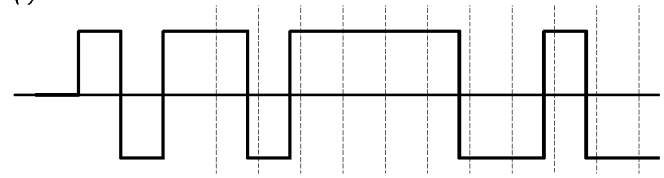
Figure 12C:
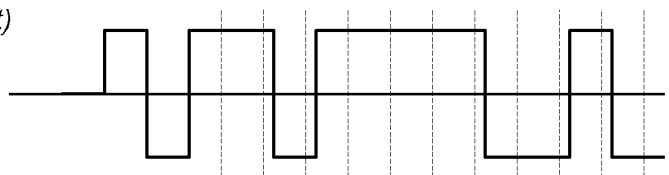
Figure 12D:
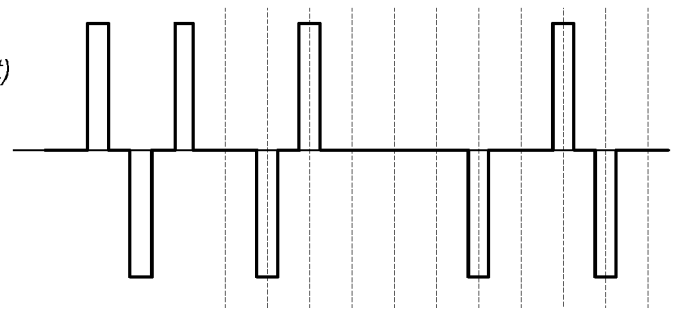
Figure 12E:
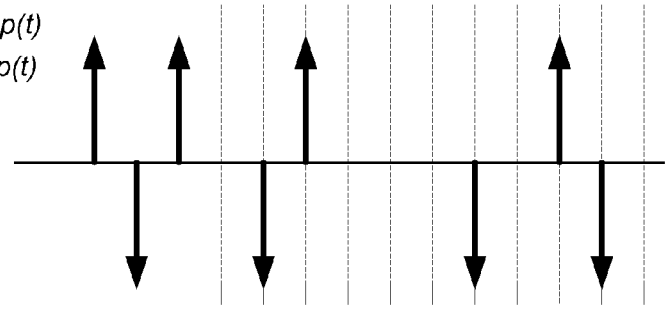

To facilitate understanding, the polarity-controlled sampling is explained referring to FIGS. 12A-12E. FIGS. 12A, 12B, and 12C schematically illustrate the received PN code r(t), the early reference code e(t), and the late reference code l(t), respectively. The discriminator function (e−l) can be expressed as:

$$\overline{r(t)e(t)} - \overline{r(t)l(t)} \equiv e - l,$$

where $$\overline{x(t)y(t)}$$

means an average of x(t)y(t) over a certain time period. The time period may be 20 milliseconds. Since $$\overline{r(t)e(t)} - \overline{r(t)l(t)} = \overline{r(t)e(t) - r(t)l(t)} = \overline{r(t)[e(t) - l(t)]},$$

the discriminator function can also be obtained using a difference function e(t)−l(t) (FIG. 12D) before averaging. When the early reference code e(t) and the late reference code l(t) get infinitely close to the prompt reference code, the difference function e(t)−l(t) becomes a sequence of infinitely narrow pulses with a constant magnitude and two polarities, as shown in FIG. 12E. The positive polarity corresponds to a rising edge of the prompt reference code, and the negative polarity corresponds to a falling edge of the prompt reference code. The constant magnitude can set as a factor one (1). Accordingly, in accordance with the embodiments of the present invention, simple sampling of the received PN code r(t) at the rising and falling edges of the prompt reference code is used. It should be noted in accordance with embodiments of the present invention, only the prompt reference code is used, and it is not necessary to generate the early and late reference codes. Furthermore, the code generator only needs to generate the sampling points, and there is no need to multiply waveforms, either.

Figure 13:
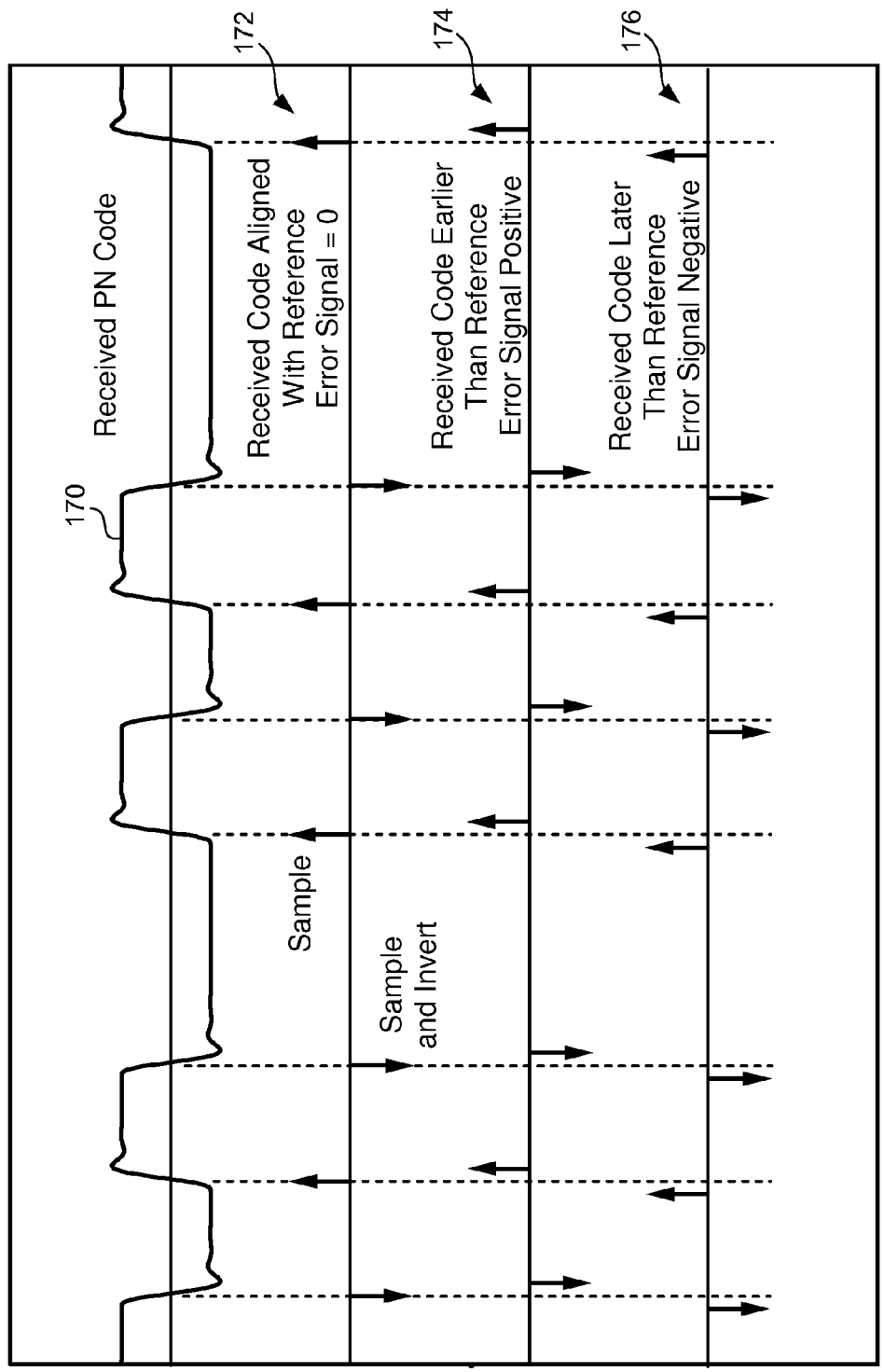
FIG. 13 is a schematic timing chart illustrating the PN code sampling train for three cases in accordance with one embodiment of the present invention.

FIG. 13 shows the sampling train for three cases in accordance with one embodiment of the present invention. The received PN code 170 is illustrated with a more realistic wave form, in which the rising and falling edges are not perfectly vertical. If the zero-crossings of the received PN code 170 are time-aligned with the sampling times given by the reference code (i.e., the reference code is aligned with the received PN code, as denoted by 172), the value of each sample at the I-channel polarity-controlled sampler 160a is zero (ignoring noise) regardless of the polarity, so the accumulated number 164a, i.e., the value IS=0. If the zero crossings occur before the sampling times (i.e., the reference code is later than the received PN code, as denoted by 174), the polarity-controlled sampling makes the value of each sample positive, so the accumulated number 164a, i.e., IS is positive. On the other hand, if the zero crossings occur after the sampling times (i.e., the reference code is earlier than the received PN code, as denoted by 176), the value of each sample is negative, so the accumulated number 164a, i.e., IS is negative.

Referring back to FIG. 7, the sampling train for the Q-channel polarity-controlled sampler 160b, which operates in identical fashion, is identical to that of the I-channel polarity-controlled sampler 160a. The Q-channel accumulator 162b produces a new value QS (output 164b) at the same time that a new value of IS (output 164a) is produced. The error signal 168 for the DLL PN code tracking loop 80 is the inner product E=IS×I+QS×Q, in which I and Q are the outputs 154a and 154b of the signal recovery correlators 76a, 76b, respectively, and I and Q can optionally be limited to 1 bit to reduce computation. This operation is performed by mixers 178a and 178b and an adder 180 as shown in FIG. 7. The error signal 168 (E) is updated every 20 milliseconds and sent to the DLL loop filter 82.

Figure 14A:
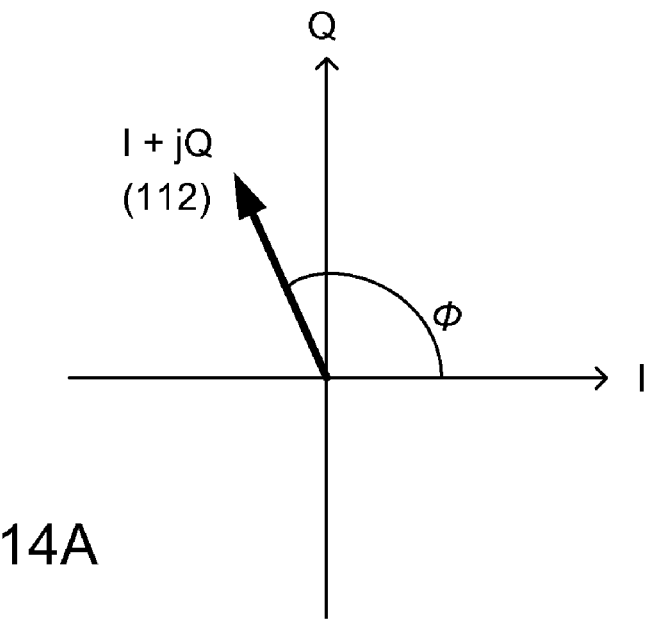
FIGS. 14A-B are diagrams schematically illustrating the carrier signal and the PN code in the complex plane.
Figure 14B:
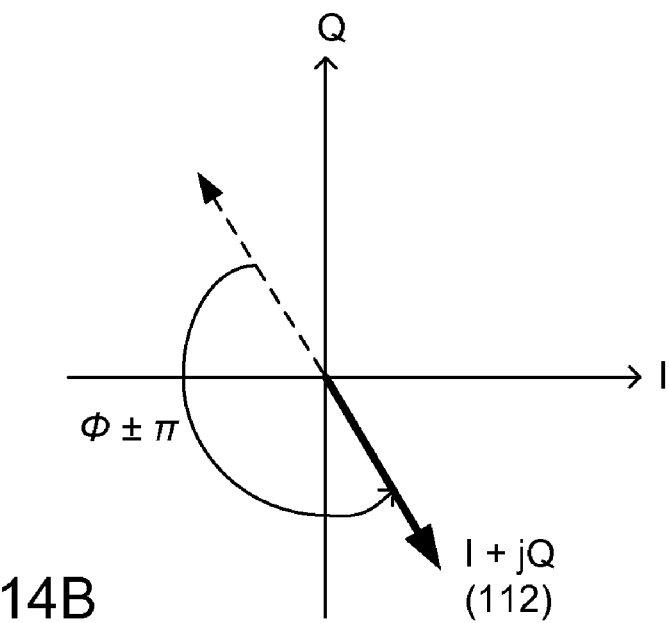

The GPS carrier signal can be expressed as I(t)+jQ(t), where I(t)=cos 2πft, Q(t)=sin 2πft, and j=√−1. Thus, the complex signal 28 after the complex mixer 22 is expressed as a vector rotating at 4.1239 MHz in the complex plane. When the signal is brought to the baseband signal (at zero frequency f, see FIGS. 2F-2H), the carrier signal vector (I(t), Q(t))=(cos ϕ, sin ϕ)) is stationary in the complex plane, where ϕ is an arbitrary angle, as shown in FIG. 14A. The PN code thereon flips the polarity of the carrier signal, as shown in FIG. 14B, at the timing in accordance with the unique pattern of the PN code. If the angle ϕ happens to be 90 degrees, the I-channel has no signal output, but the Q-channel has the full signal output. By using both of the I and Q values, the baseband signal is obtained regardless of the arbitrary angle ϕ.

Figure 15A:
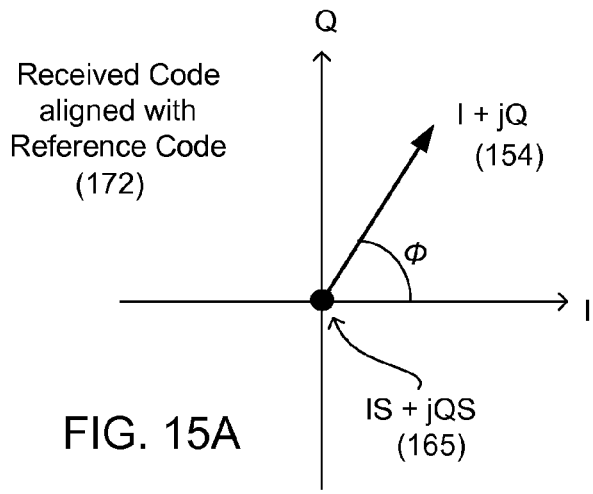
FIGS. 15A-C are diagrams schematically illustrating the DLL error signal and the baseband signal in the complex plane.
Figure 15B:
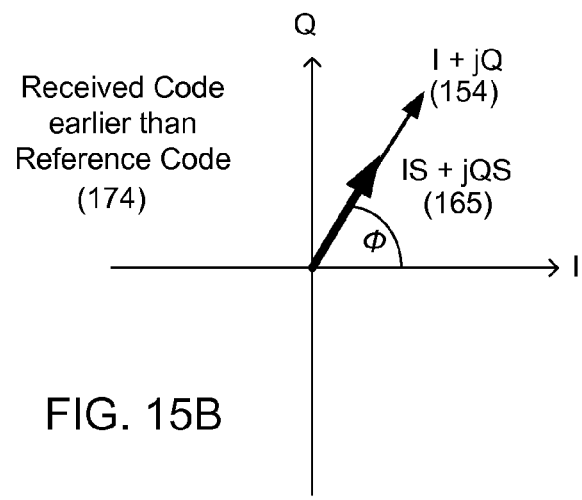
Figure 15C:
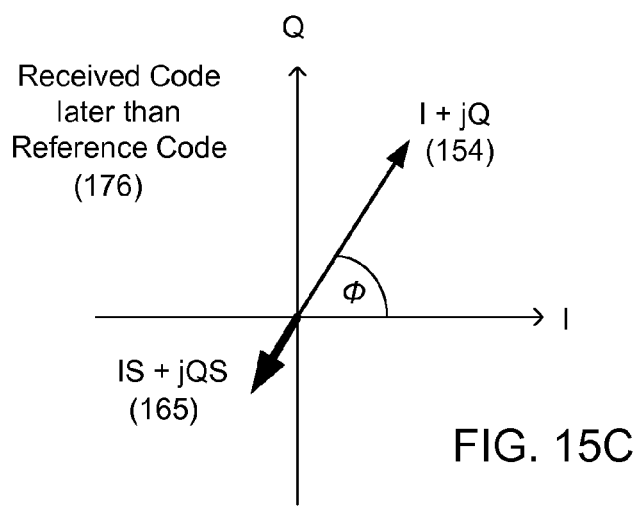

The outputs 164a (IS) and 164b (QS) of the edge transition correlators 78a and 78b are expressed IS+jIQ in the complex plane and the angle ω is the same as the baseband PN code signal. The IS and IQ values are both zero if the received PN code and the reference code align perfectly (i.e., the length of the vector is zero), as shown in FIG. 15A, and has increasing non-zero values as the received PN code deviates from the reference code, as shown in FIGS. 15B and 15C. By obtaining the inner product with the baseband PN code signal, the error signal (E) 168 consistently reflects the amount and the direction (early or late) of the misalignment insensitive to the arbitrary angle ϕ.

Referring back to FIG. 4, the DLL loop filter 82 can simply be an accumulator which sums the updates of the error signal 168 (E), and issues a burst of high-resolution code advance or retard commands 134 to the Reference PN Code Generation and Control Section 74 of FIG. 6 when the sum reaches a given positive or negative threshold. The accumulator (the DLL loop filter 82) would then reset to zero and resume summing updates of the error signal 168 (E). The effective bandwidth of the DLL loop filter 82 can be varied by changing the threshold values and/or the number of commands in the command bursts.

Other embodiments of the DLL loop filter 82 are possible, and many are well known in the art. For example the DLL loop filter 82 could be a second order filter with two accumulators.

Multipath Mitigation Filters

Figure 16E:
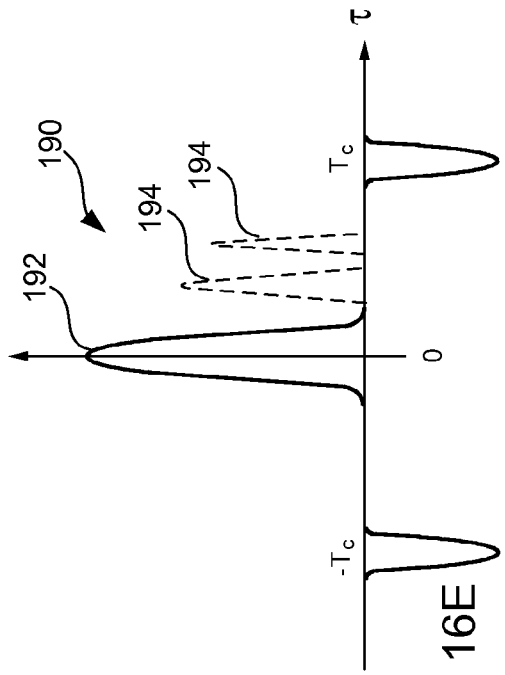
Figure 16D:
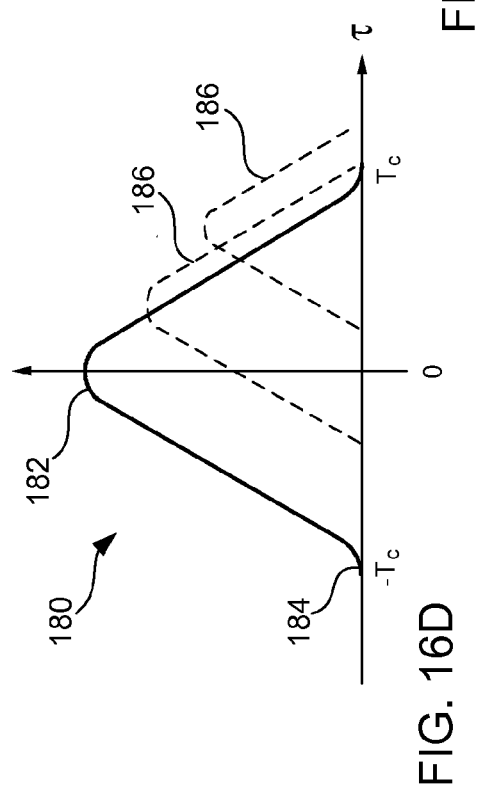

Each of the I and Q baseband signals 112a and 112b from the Doppler compensation phase rotator 72 pass through a simple yet effective multipath mitigation filter 84 as shown in FIG. 16A. Only the I-channel filter 84a is shown, since the Q-channel filter 84b (not shown) is identical, and therefore the following discussion will consider only the I-channel. The I-channel filter 84a achieves multipath mitigation by sharpening the signal cross-correlation function as indicated in the FIGS. 16B-16E. If only a direct path signal is present with no multipath mitigation in place, the cross-correlation function 180 is a triangle two chips wide (−Tc to Tc) at the base, as shown in FIG. 16B. The peak 182 of the function and the extremities 184 of its base are rounded due to the receiver bandwidth. When multipath is present, additional shifted and scaled copies of the triangle 186 are superimposed on the direct path triangle, which can shift the location of the correlation function peak, as shown in FIG. 16D.

Since the location of the correlation peak determines the estimate of signal delay and the corresponding pseudorange used for positioning, the shift in the peak caused by multipath causes an error in pseudorange. The peak will be shifted less if it is made sharper by increasing the receiver bandwidth. Indeed, this is one reason that the current invention provides a wide signal bandwidth.

However, the peak can be made even sharper yet by appropriately altering the baseband signal r(t) (the baseband signal 112a) with the multipath mitigation filter 84a in FIG. 16A. In accordance with one embodiment of the present invention, the negative of the second derivative of the signal, not the correlation function, is approximately obtained using the multipath mitigation filter 84a. To see how this is done, we disregard the noise on the baseband signal r(t) and let R(τ) be the conventional cross-correlation function 180 shown in FIG. 16B. Then, the negative of the second derivative of R(τ) is $$-R''(\tau) = -\frac{d^2}{d\tau^2}\int r(t)m(t-\tau)dt$$
$$= -\frac{d^2}{d\tau^2}\int r(u+\tau)m(u)du$$
$$= -\int r''(u+\tau)m(u)du$$
$$= \int [-r''(t)]m(t-\tau)dt$$

where m(t) is the receiver-generated code 136. The function $-R''(\tau)$ (denoted by 190) is shown in FIG. 16C. Its peak 192 will generally be sharper than the conventional cross-correlation function 180. The additional shifted and scaled copies of the triangle 194 are also sharpened and thus more separated from the direct path correlation function 192, and thus less likely to shift the location of the correlation function peak, as shown in FIG. 16E. The above derivation shows that $-R''(\tau)$ is the cross-correlation of $-r''(t)$ with the receiver-generated code m(t). The output signal 200a of the multipath mitigation filter 84a is $\frac{1}{2}r(t)-r(t-\Delta)+\frac{1}{2}r(t-2\Delta)$, where $\Delta$ is the sampling interval of the TCXO clock 15. The output signal 200a is a double difference approximation of $-r''(t-\Delta)$. Thus, the I-channel edge transition correlator 78a will be tracking a signal with a sharpened cross-correlation function 190, significantly reducing tracking error due to multipath. The delay $\Delta$ which has been introduced by the filter 84a is not a problem, because an identical delay is introduced at the input to the signal recovery correlators 76 as shown in FIG. 4. As is well known in the art, a delay common to all satellite signals does not affect the positioning or velocity performance of a GPS receiver. The multipath mitigation filter 84 approximate the second derivative of the correlation function with the simple structure. An optional switch 202 may be provided so as to enable the multipath mitigation filter 84 when multipath effects exist, and disable when there is no multipath interference.

The multipath mitigation filter 84 can have other forms. For example, further sharpening of the cross-correlation is possible by using a fourth difference filter, at the expense of a degradation in the effective SNR of the signal. Nonetheless, such a filter could be useful in more severe multipath environments.

Concurrently Operating FLL and PLL Carrier Tracking Loop

An important component of the current invention is a signal carrier tracking loop in which a FLL carrier tracking loop 90 and PLL carrier tracking loop 91 operate simultaneously to maintain high tracking sensitivity, perform well in the presence of receiver acceleration, and autonomously recover lock on the carrier after severe signal disruptions.

The signal acquisition portion (or the signal acquisition mode) of the GPS/GNSS receiver (1) finds the signal, (2) positions and aligns the received PN code and the receiver-generated (reference) code within ±1 chip or preferably within ±½ chip, and (3) finds an approximate frequency within an error of 20-30 Hz, for example. The frequency error is due to the Doppler shift of the transmitted frequency, frequency error in the receiver oscillator TCXO, and the like. As a result, the baseband signal may not be at exactly zero frequency. However, the signal tracking portion (signal tracking mode) of the receiver requires the baseband signal at the zero-frequency, or at a frequency close enough to zero, such that the signal recovery correlators and the code tracking correlators can operate properly. Accordingly, the FLL carrier tracking loop controls the Doppler compensation phase rotator 72 in accordance with one embodiment of the present invention to offset and correct the frequency error from about 25 Hz to about 1 Hz or less, for example.

The FLL portion 90 of the carrier tracking loop detects the baseband carrier frequency error by means of a frequency detector 92 shown in FIG. 4 which creates an error signal 93 from the I and Q outputs 154 (154a and 154b) of the signal recovery correlators 76 (76a, 76b) and feeds the filtered error signal 95 through a FLL loop filter 94 to the Doppler compensation phase rotator 72.

Figure 17:
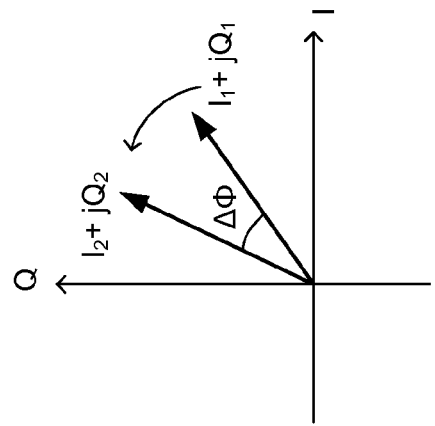
FIG. 17 is a diagram schematically illustrating an example of two successive baseband correlator output signals for generating the FLL error signal in accordance with one embodiment of the present invention.

In one embodiment of the present invention, the FLL error signal 93 ($E_{freq}$) is generated from two successive 10-millisecond correlations within each 20-millisecond navigation data bit according to the expression:

$$E_{freq} = \frac{Q_2 I_1 - I_2 Q_1}{(I_1 + I_2)^2 + (Q_1 + Q_2)^2}$$

where the subscripts 1 and 2 indicate the first and second correlations within the bit. In this expression the denominator is a normalizing factor to make the size of $E_{freq}$ relatively insensitive to signal power level. For example, two vectors $Z_1=I_1+jQ_1$ at time $t_1$ and $Z_2=I_2+jQ_2$ at time $t_2$ representing two successive outputs 154 (see FIG. 4) may be used to obtain the angle $\Delta\phi$ between the two vectors, as shown in FIG. 17. From the cross product of the two vectors, and using $2\pi f\Delta T=\Delta\phi\approx \sin\Delta\phi$ when $\Delta\phi$ is small, where $\Delta T=t_1-t_2$, the equation above is obtained (with an appropriate factor).

In another embodiment, the data bit is divided into 5 equal 4-millisecond time intervals, and an I and Q correlation is performed over each subinterval. In this case the successive subintervals are indexed by −2, −1, 0, 1, and 2, and the error signal $E_{freq}$ is generated according to the expression:

$$E_{freq} = \frac{\sum_{k=-2}^{2} I_k \sum_{k=-2}^{2} kQ_k - \sum_{k=-2}^{2} Q_k \sum_{k=-2}^{2} kI_k}{\left(\sum_{k=-2}^{2} I_k\right)^2 + \left(\sum_{k=-2}^{2} Q_k\right)^2}$$

Of course, with either of these FLL error generation methods, bit synchronization must have already taken place to locate the navigation data bit boundaries.

The FLL loop filter 94, which reduces noise, should be at least of second order, so that the signal can be tracked in frequency with zero error during constant receiver acceleration, and the loop should be critically damped. The gain of the FLL loop filter 94 can be chosen to maintain tracking as low as −160 dBm, yet have rapid transient response at higher signal levels. A design well known in the art can be used. The FLL loop 90 keeps the baseband signal at the zero or almost zero frequency.

Figure 18A:
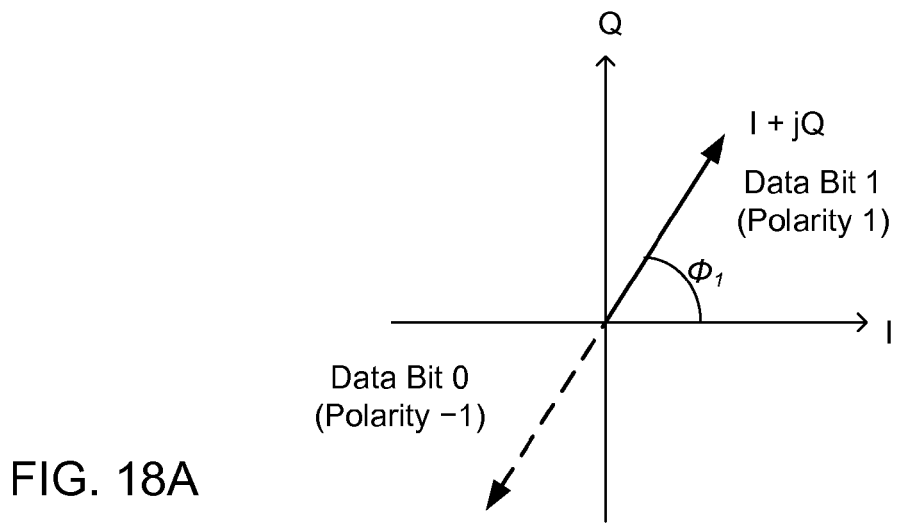
FIGS. 18A-B schematic diagrams illustrating effects of the phase error in the baseband signal on data bits.
Figure 18B:
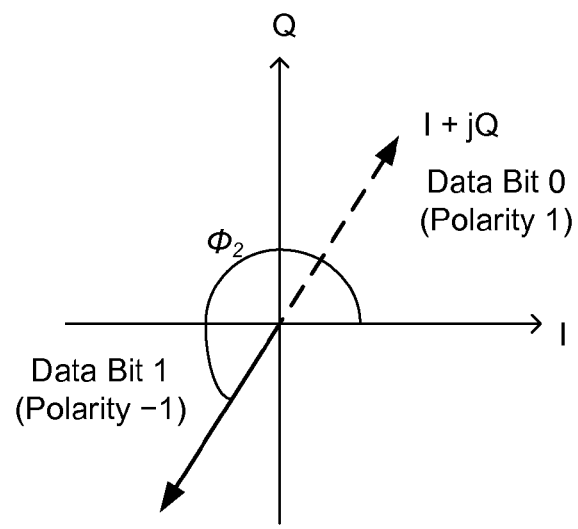

Navigation data, which has a bit length of 20 msec, reverses the phase of the carrier signal in a similar manner as the PN code such that data bit 0 has the opposite polarity as data bit 1. If the baseband signal has a close-to-zero frequency, the corresponding baseband vector is slowly rotating in the complex plane, for example, at the frequency 1 Hz. When the signal vector is in the first quadrant, the data bit 0 corresponds to the reversed (flipped) vector in the third quadrant, as shown in FIG. 18A. On the other hand, when the signal vector is in the third quadrant, the data bit 0 corresponds to the reversed (flipped) vector in the first quadrant, as shown in FIG. 18B. Thus, if the baseband signal shifts into a different quadrant within the time period of the navigation data bit length, the output data would be erroneous.

Figure 19:
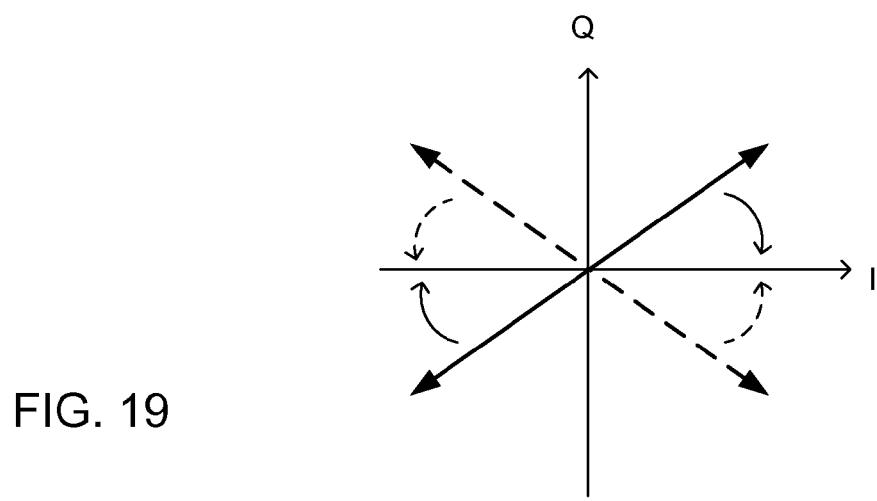
FIG. 19 schematically illustrates an example of phase error correction based on the FLL error signal in accordance with one embodiment of the present invention.

Accordingly, the PLL portion 91 of the carrier tracking loop detects the baseband signal phase by the phase detector 96 to create a phase error signal 97 which is passed through a PLL loop filter 98 to the Doppler compensation phase rotator 72. In one embodiment the PLL error signal $E_{phase}$ is generated according to the expression:

$$E_{phase} = \frac{IQ}{I^2 + Q^2}$$

where I and Q are outputs 154a and 154b of the signal recovery correlators 76 (76a, 76b) over the full 20 millisecond data bit interval, and are easily formed by summing the shorter correlations used in methods of forming the FLL error signal described above. The value IQ is positive if the vector is in the first or third quadrant, and negative if the vector is in the second or fourth quadrant, as shown in FIG. 19. The positive FLL error signal causes a clock-wise correction to be applied and the negative FLL error signal causes a counter clock-wise correction to be applied such that in either case the signal vector is aligned with the I-axis such that the correspondence between the data bit (1 or 0) and the detected polarity (±1) on the I-axis is consistent throughout the long data. Which data bit has which polarity may be determined from a preamble of the navigation message having a known 8-bit pattern by comparing the detected bit pattern of the preamble with the known pattern.

In another embodiment the PLL error signal is generated according to the expression $$E_{phase} = \frac{Q \operatorname{sgn} I}{|I| + |Q|}$$

where | | denotes absolute value and sgn I is +1 if I is positive, 0 if I is zero, and −1 if I is negative. With either of these embodiments, the PLL error signal $E_{phase}$ is updated every 20 milliseconds.

In one embodiment the PLL loop filter 98 simply issues a burst of Δ-state commands to the Doppler compensation phase rotator 72 every 20 milliseconds as each update of PLL error signal 97 ($E_{phase}$) is received. The number of Δ-state commands in each burst is the closest integer to $KE_{phase}$, where K is a positive gain constant. A large value of K permits the PLL tracking loop 91 to respond more quickly to phase transients, but at the expense of noisier operation. A small value of K reduces noise, but makes the loop phase response more sluggish. In another embodiment the PLL loop filter 98 is a conventional design, which might be of second order.

An important element of the current invention is the means by which the FLL carrier tracking loop 90 and PLL carrier tracking loop 91 can simultaneously control the Doppler compensation phase rotator 72 without interfering with each other. Such simultaneous operation has following advantages:

The PLL carrier tracking loop can maintain phase lock at higher signal levels (approximately >−149 dBm) for accurate code rate aiding and velocity determination, while the FLL carrier tracking loop will autonomously continue frequency tracking down to approximately −160 dBm so that some degree of code rate aiding still exists.

The FLL carrier tracking loop removes stress on the PLL carrier tracking loop by driving the frequency error toward zero.

The FLL carrier tracking loop significantly extends the frequency pull-in range of the PLL carrier tracking loop.

No switching between PLL carrier tracking loop and FLL carrier tracking loop operation is required, so no decisions need to be made as to when switching should occur.

When the signal starts to increase at the end of a signal dropout, the FLL carrier tracking loop can keep the frequency error small enough so that the PLL carrier tracking loop can pull in near its tracking threshold, where its pull-in range is much smaller than at higher signal levels.

Figure 20:
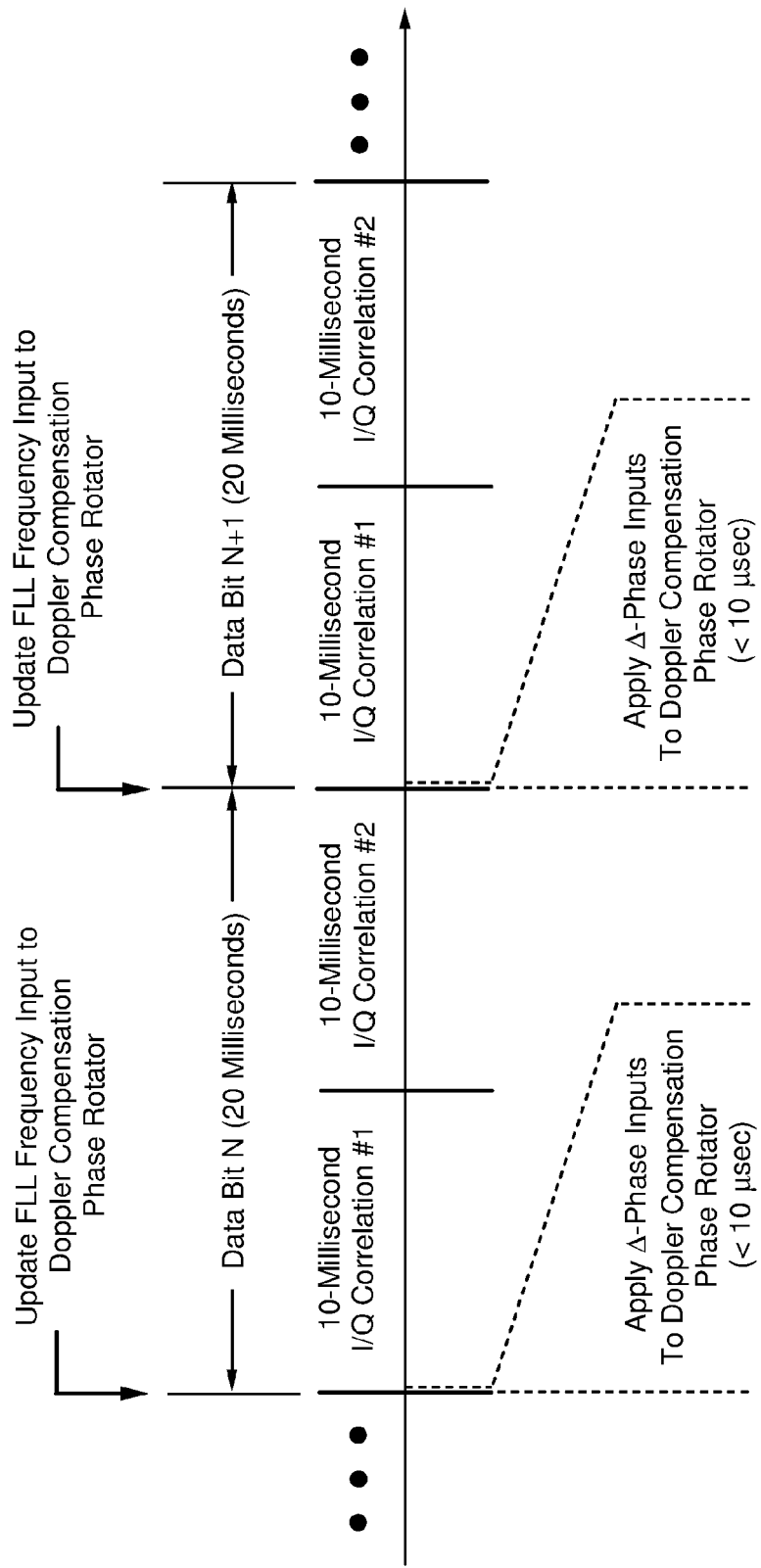
FIG. 20 is a schematic timing diagram illustrating the method of controlling the Doppler compensation phase rotator without mutual interference between the PLL and FLL error signals in accordance with one embodiment of the present invention.

The method of controlling the Doppler compensation phase rotator 72 without mutual interference between the PLL and FLL error signals is shown in FIG. 20. The illustration assumes the first embodiment of FLL frequency error generation presented above, but it should be clear that the second embodiment, or other embodiments could be used. The Δ-state outputs 99 from the output of the PLL loop filter 98 are applied every 20 milliseconds to the Doppler compensation phase rotator 72 only during a small time interval at the beginning of the first 10-millisecond I/Q correlation within each data bit. This time interval can easily be less than 10 microseconds, which is such a small fraction of the 10 millisecond correlation interval that, other than shifting the phase of the first and second I/Q correlator output vectors by the same amount, it will have negligible effect on the first I/Q correlator output. As a result, the effect on the calculation of the FLL error signal 95 will likewise be negligible, since the FLL error signal is unaffected by a common phase shift of the first and second I/Q correlator output vectors.

Goals Met By the Embodiments of the Present Invention

A low-cost receiver architecture has been described which has high bandwidth for best performance in positioning accuracy, robustness of tracking, and multipath performance, but which still has a small TTFF using a small snapshot memory. The reference oscillator and sampling frequencies are relatively low, similar to those of current low-cost receiver designs. The bandwidth is the highest that is theoretically possible without SNR degradation, given the sampling rate of the signal at the output of the RF/IF front end. The design is such that the receiver can acquire satellites at low bandwidth using the snapshot memory at the same time it is tracking other satellites at high bandwidth. The receiver will have superior tracking sensitivity combined with robustness of tracking in dynamic environments with changing signal levels, without the problems inherent in switching between PLL and FLL tracking loops. The receiver is capable of accurately tracking phase whenever the signals are sufficiently strong (approximately −149 dBm or more). The receiver DLL correlators will have performance levels equal to or better than narrow correlators, and the receiver incorporates a simple but effective multipath mitigation technique. The receiver will not have oscillatory positioning errors at near-zero Doppler frequencies.

Application to Other Global Navigation Satellite System (GNSS) Receivers

Although the current invention has been described in the context of a C/A code GPS receiver, those with ordinary skill in the art will understand that the current invention can also be incorporated in GPS receivers using other carrier frequencies and PN codes, and more generally in other GNSS receivers as well.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A low-cost GPS/GNSS receiver for receiving a satellite signal at an RF frequency ($f_{RF}$), the GPS/GNSS receiver comprising:
   a front end section for receiving the satellite signal and generating a digital complex signal having a first bandwidth, the received satellite signal being converted into a complex signal before digitizing;
   a signal capturing section for searching for and acquiring the satellite signal, the signal capturing section including a capture memory;
   a baseband processor for tracking the acquired satellite signal; and
   a signal splitter coupled to the front end section, the signal splitter splitting the digital complex signal into two bandwidths,
   wherein the signal splitter generates a narrowband digital complex signal having a second bandwidth substantially smaller than the first bandwidth, provides the narrowband digital signal to the capture memory, and provides a wider bandwidth digital complex signal having the first bandwidth to the baseband processor.

2. The low-cost GPS/GNSS receiver of claim 1, wherein the first bandwidth is approximately 16 MHz and the second bandwidth is approximately 1 MHz.

3. The low-cost GPS/GNSS receiver of claim 1, wherein the signal splitter includes, for the narrowband digital signal:
   a digital low-pass filter having a cut-off frequency of 0.5 MHz;
   a sub-sampler coupled to the digital low-pass filter for reducing a sample frequency to $f_r/8$, where $f_r$ is the receiver reference oscillator frequency; and
   a bit decoder coupled to the sub-sampler.

4. The low-cost GPS/GNSS receiver of claim 1, wherein said front end section comprises:
   a reference oscillator for generating a global clock signal having a reference frequency ($f_r$);
   a first clock circuit for generating a first local clock signal having a first frequency;
   a second clock circuit for generating a second local clock signal having a second frequency, the second clock signal being a complex signal having an I-component for an I channel and a Q-component for a Q-channel;
   a third clock circuit for generating a third local clock signal having a third frequency, the third clock signal being a complex signal having an I-component for the I channel and a Q-component for the Q-channel;
   a first mixer for combining the received satellite signal with the first local clock signal to generate a first IF signal;
   a band-pass filter for band-pass filtering the first IF signal to have a first center frequency and a first bandwidth;
   a second mixer for generating a complex IF signal by combining the first IF signal with the second local clock signal;
   a low-pass filter for low-pass filtering the complex IF signal to have a second center frequency and the first bandwidth;
   an analog/digital converter for sampling the complex IF signal and generating a digital complex signal; and
   a third mixer for reducing a center frequency of the digital complex signal to a third center frequency by combining the digital complex signal with the third clock signal.

5. The low-cost GPS/GNSS receiver of claim 4, wherein:
   the reference frequency ($f_r$) is approximately 16.36767 MHz;
   the first frequency is approximately $100f_r$;
   the second frequency is approximately $4f_r$;
   the third frequency is approximately $f_r/4$;
   the first bandwidth is approximately 16 MHz;
   the first center frequency is approximately ($100f_r - f_{RF}$);
   the second center frequency is approximately $4f_r - (100f_r - f_{RF})$; and
   the third center frequency is approximately $f_r/512$.

6. The low-cost GPS/GNSS receiver of claim 1, wherein the baseband processor comprises:
   a Doppler compensation phase rotator for receiving a wideband complex digital satellite signal from a front end section of the GPS/GNSS receiver, and generating a complex baseband signal having a nominally zero frequency, the complex baseband signal carrying received PN code;
   a PN code generator for generating a reference code;
   a code tracking correlator for correlating the reference code and the received PN code by sampling the complex baseband signal at a timing and polarity given by the reference code so as to generate a DLL error signal; and
   a DLL code tracking loop for feeding back the DLL error signal to the PN code generator, the reference code being shifted in accordance with the DLL error signal such that the reference code aligns with the received PN code.

7. The low-cost GPS/GNSS receiver of claim 6, wherein said baseband signal processor further comprises:
   a signal recovery correlator for receiving the complex baseband signal and correlating the reference code and the received PN code so as to output a despread complex baseband signal.

8. The low-cost GPS/GNSS receiver of claim 7, wherein said signal recovery correlator comprises:
   a mixer for multiplying the complex baseband signal with the reference code signal; and
   an averager for averaging the multiplied signal over a certain period of time and outputting a complex correlation value as the despread complex baseband signal.

9. The low-cost GPS/GNSS receiver of claim 7, wherein said code tracking correlator comprises:
   a polarity-controlled sampler for sampling the complex baseband signal at a rising edge of the reference code with a polarity and at a falling edge of the reference code with an inversed polarity so as to output sampled complex signal values; and an averager for accumulating the sampled complex signal values for a certain period of time and outputting an accumulated complex value signal; and an error signal generator for obtaining an inner product of the accumulated complex value signal and the complex correlation value to output the DLL error signal.

10. The low-cost GPS/GNSS receiver of claim 7, wherein said baseband signal processor further comprises:

a multipath mitigation filter coupled between the Doppler compensation phase rotator and the code tracking correlator.

11. The low-cost GPS/GNSS receiver of claim 10, wherein said multipath mitigation filter obtains an approximation of a negative of a second derivative of the complex baseband signal.

12. The low-cost GPS/GNSS receiver of claim 8, wherein said baseband signal processor further comprises:

an FLL carrier tracking loop including a frequency error detector for detecting a frequency error in the complex baseband signal and generating a frequency error signal, based on a plurality of complex correlation values output from the signal recovery correlator; and a PLL carrier tracking loop including a phase error detector for detecting a phase error in the complex baseband signal and generating a phase error signal, based on the complex correlation value output from the signal recovery correlator, wherein the frequency error signal and the frequency error signal control the Doppler compensation phase rotator simultaneously without mutual interference.

13. The low-cost GPS/GNSS receiver of claim 12, the PLL carrier tracking loop applies the phase error signal to the Doppler compensation phase rotator for a time interval at a beginning of a first period of time over which the multiplied signal is averaged in said averager of said signal recovery correlator, the time interval being significantly smaller than the first period of time.

14. A front end section in a low-cost GPS/GNSS receiver for receiving a satellite signal at an RF frequency ($f_{RF}$), the front end section comprising:

a reference oscillator for generating a global clock signal having a reference frequency ($f_r$);

a first clock circuit for generating a first local clock signal having a first frequency;

a second clock circuit for generating a second local clock signal having a second frequency, the second clock signal being a complex signal having an I-component for an I channel and a Q-component for a Q-channel;

a third clock circuit for generating a third local clock signal having a third frequency, the third clock signal being a complex signal having an I-component for the I channel and a Q-component for the Q-channel;

a first mixer for combining the received satellite signal with the first local clock signal to generate a first IF signal;

a band-pass filter for band-pass filtering the first IF signal to have a first center frequency and a first bandwidth;

a second mixer for generating a complex IF signal by combining the first IF signal with the second local clock signal;

a low-pass filter for low-pass filtering the complex IF signal to have a second center frequency and the first bandwidth;

an analog/digital converter for sampling the complex IF signal and generating a digital complex signal; and a third mixer for reducing a center frequency of the digital complex signal to a third center frequency by combining the digital complex signal with the third clock signal.

15. The front end section of the low-cost GPS/GNSS receiver in accordance with claim 14, wherein:

the reference frequency ($f_r$) is approximately 16.36767 MHz;

the first frequency is approximately $100f_r$;

the second frequency is approximately $4f_r$;

the third frequency is approximately $f_r/4$;

the first bandwidth is approximately 16 MHz;

the first center frequency is approximately ($100f_r-f_{RF}$);

the second center frequency is approximately $4f_r-(100f_r-f_{RF})$; and the third center frequency is approximately $f_r/512$.

16. A baseband signal processor in a low-cost GPS/GNSS receiver, the baseband processor comprising:

a Doppler compensation phase rotator for receiving a wideband complex digital satellite signal from a front end section of the GPS/GNSS receiver, and generating a complex baseband signal having a nominally zero frequency, the complex baseband signal carrying received PN code;

a PN code generator for generating a reference code;

a code tracking correlator for correlating the reference code and the received PN code by sampling the complex baseband signal at a timing and polarity given by the reference code so as to generate a DLL error signal;

a DLL code tracking loop for feeding back the DLL error signal to the PN code generator, the reference code being shifted in accordance with the DLL error signal such that the reference code aligns with the received PN code; and a signal recovery correlator for receiving the complex baseband signal and correlating the reference code and the received PN code so as to output a despread complex baseband signal.

17. The baseband signal processor of claim 16, wherein said signal recovery correlator comprises:

a mixer for multiplying the complex baseband signal with the reference code signal; and an averager for averaging the multiplied signal over a certain period of time and outputting a complex correlation value as the despread complex baseband signal.

18. The baseband signal processor of claim 16, wherein said code tracking correlator comprises:

a polarity-controlled sampler for sampling the complex baseband signal at a rising edge of the reference code with a polarity and at a falling edge of the reference code with an inversed polarity so as to output sampled complex signal values; and an averager for accumulating the sampled complex signal values for a certain period of time and outputting an accumulated complex value signal; and an error signal generator for obtaining an inner product of the accumulated complex value signal and the complex correlation value to output the DLL error signal.

19. The baseband signal processor of claim 16, further comprising:

a multipath mitigation filter coupled between the Doppler compensation phase rotator and the code tracking correlator.

20. The baseband signal processor of claim 19, wherein said multipath mitigation filter obtains an approximation of a negative of a second derivative of the complex baseband signal.

21. The baseband signal processor of claim 17, further comprising:

an FLL carrier tracking loop including a frequency error detector for detecting a frequency error in the complex baseband signal and generating a frequency error signal, based on a plurality of complex correlation values output from the signal recovery correlator; and a PLL carrier tracking loop including a phase error detector for detecting a phase error in the complex baseband signal and generating a phase error signal, based on the complex correlation value output from the signal recovery correlator, wherein the frequency error signal and the frequency error signal control the Doppler compensation phase rotator simultaneously without mutual interference.

22. The baseband signal processor of claim 21, wherein the PLL carrier tracking loop applies the phase error signal to the Doppler compensation phase rotator for a time interval at a beginning of a first period of time over which the multiplied signal is averaged in said averager of said signal recovery correlator, the time interval being significantly smaller than the first period of time.

23. A method for processing a satellite signal having an RF frequency ($f_{RF}$) in a low-cost GPS/GNSS receiver, the method comprising:

receiving the satellite signal at a front end section;

generating a complex signal having a first bandwidth from the received satellite signal using a complex clock signal;

sampling the complex signal to generate a digital complex signal;

splitting the digital complex signal into two bandwidths, by generating a narrowband digital complex signal from one of the split digital complex signals, the narrowband digital complex signal having a second bandwidth substantially smaller than the first bandwidth;

providing the narrowband digital complex signal to a capture memory in a signal capturing section to search for and acquire the satellite signal; and providing the other of the split digital complex signals to a baseband processor for tracking the acquired satellite signal.

24. The method of claim 23, wherein the first bandwidth is approximately 16 MHz and the second bandwidth is approximately 1 MHz.

25. The method of claim 23, wherein said generating the narrowband digital complex signal includes:

low-pass filtering the digital complex signal with a cut-off frequency of 0.5 MHz;

sub-sampling the low-pass filtered digital complex signal with a sampling frequency of $f_r/8$, where $f_r$ is the receiver reference oscillator frequency; and bit decoding the sub-sampled, low-pass filtered digital complex signal.

26. The method of claim 23, wherein said generating a complex signal having a first bandwidth comprises:

generating a global clock signal having a reference frequency ($f_r$);

generating a first local clock signal having a first frequency;

generating a second local clock signal having a second frequency, the second clock signal being a complex signal having an I-component for an I channel and a Q-component for a Q-channel;

generating a third local clock signal having a third frequency, the third clock signal being a complex signal having an I-component for the I channel and a Q-component for the Q-channel;

combining the received satellite signal with the first local clock signal to generate a first IF signal;

band-pass filtering the first IF signal to have a first center frequency and a first bandwidth;

generating a complex IF signal by combining the first IF signal with the second local clock signal; and low-pass filtering the complex IF signal to have a second center frequency and the first bandwidth.

27. The method of claim 26, wherein said sampling the complex signal to generate a digital complex signal comprises:

sampling the complex IF signal and generate the digital complex signal; and reducing a center frequency of the digital complex signal to a third center frequency by combining the digital complex signal with the third clock signal.

28. The method of claim 27, wherein:

the reference frequency ($f_r$) is approximately 16.36767 MHz;

the first frequency is approximately $100f_r$;

the second frequency is approximately $4f_r$;

the third frequency is approximately $f_r/4$;

the first bandwidth is approximately 16 MHz;

the first center frequency is approximately ($100f_r-f_{RF}$);

the second center frequency is approximately $4f_r-(100f_r-f_{RF})$; and the third center frequency is approximately $f_r/512$.

29. The method of claim 23, further comprising:

receiving the other of the split digital complex signals as a wideband complex digital signal;

generating, from the wideband complex signal, a complex baseband signal having a nominally zero frequency, the complex baseband signal carrying received PN code;

generating a reference code;

correlating the reference code and the received PN code by sampling the complex baseband signal at a timing and polarity given by the reference code so as to generate a DLL error signal; and shifting the reference code in accordance with the DLL error signal such that the reference code aligns with the received PN code.

30. The method of claim 29, further comprising:

correlating the reference code and the received PN code by multiplying the reference code signal with the complex baseband signal; and averaging the multiplied signal over a certain period of time so as to output a complex correlation value as a despread complex baseband signal.

31. The method of claim 30, wherein said correlating the reference code and the received PN code by sampling the complex baseband signal includes:

sampling the complex baseband signal at a rising edge of the reference code with a polarity and at a falling edge of the reference code with an inversed polarity so as to output sampled complex signal values;

accumulating the sampled complex signal values for a certain period of time and outputting an accumulated complex value signal; and obtaining an inner product of the accumulated complex value signal and the complex correlation value to generate the DLL error signal.

32. The method of claim 29, further comprising:

performing multipath mitigation on the complex baseband signal, before said correlating the reference code and the received PN code, by sampling the complex baseband signal, and by obtaining an approximation of a negative of a second derivative of the complex baseband signal.

33. The method of claim 31, further comprising:

detecting a frequency error in the complex baseband signal and generating a frequency error signal, based on a plurality of complex correlation values output from said averaging the multiplied signal;

detecting a phase error in the complex baseband signal and generating a phase error signal, based on the complex correlation value output from said averaging the multiplied signal;

controlling the frequency of the complex baseband signal based on the frequency error signal; and controlling the phase of the complex baseband signal based on the phase error signal, wherein the frequency error signal and the frequency error signal control the complex baseband signal simultaneously without mutual interference.

34. The baseband signal processor of claim 33, wherein said controlling the phase of the complex baseband signal applies the phase error signal for a time interval at a beginning of a first period of time over which the multiplied signal is averaged in said averaging the multiplied signal, the time interval being significantly smaller than the first period of time.

35. A method for processing a received satellite signal at an RF frequency ($f_{RF}$) at a front end section in a low-cost GPS/GNSS receiver, the method comprising:

generating a global clock signal having a reference frequency ($f_r$);

generating a first local clock signal having a first frequency;

generating a second local clock signal having a second frequency, the second clock signal being a complex signal having an I-component for an I channel and a Q-component for a Q-channel;

generating a third local clock signal having a third frequency, the third clock signal being a complex signal having an I-component for the I channel and a Q-component for the Q-channel;

combining the received satellite signal with the first local clock signal to generate a first IF signal;

band-pass filtering the first IF signal to have a first center frequency and a first bandwidth;

generating a complex IF signal by combining the first IF signal with the second local clock signal;

low-pass filtering the complex IF signal to have a second center frequency and the first bandwidth;

sampling the complex IF signal and generate a digital complex signal; and reducing a center frequency of the digital complex signal to a third center frequency by combining the digital complex signal with the third clock signal.

36. The method of claim 35, wherein:

the reference frequency ($f_r$) is approximately 16.36767 MHz;

the first frequency is approximately $100f_r$;

the second frequency is approximately $4f_r$;

the third frequency is approximately $f_r/4$;

the first bandwidth is approximately 16 MHz;

the first center frequency is approximately ($100f_r - f_{RF}$);

the second center frequency is approximately $4f_r - (100f_r - f_{RF})$; and the third center frequency is approximately $f_r/512$.

37. A method for tracking PN code in a received satellite signal in a low-cost GPS/GNSS receiver, the method comprising:

receiving a wideband complex digital satellite signal from a front end section of the GPS/GNSS receiver;

generating a complex baseband signal having a nominally zero frequency, the complex baseband signal carrying received PN code;

generating a reference code;

correlating the reference code and the received PN code by sampling the complex baseband signal at a timing and polarity given by the reference code so as to generate a DLL error signal;

shifting the reference code in accordance with the DLL error signal such that the reference code aligns with the received PN code;

correlating the reference code and the received PN code by multiplying the reference code signal with the complex baseband signal; and averaging the multiplied signal over a certain period of time so as to output a complex correlation value as a despread complex baseband signal.

38. The method of claim 37, wherein said correlating the reference code and the received PN code by sampling the complex baseband signal includes:

sampling the complex baseband signal at a rising edge of the reference code with a polarity and at a falling edge of the reference code with an inversed polarity so as to output sampled complex signal values;

accumulating the sampled complex signal values for a certain period of time and outputting an accumulated complex value signal; and obtaining an inner product of the accumulated complex value signal and the complex correlation value to generate the DLL error signal.

39. The method of claim 37, further comprising:

performing multipath mitigation on the complex baseband signal, before said correlating the reference code and the received PN code, by sampling the complex baseband signal, and by obtaining an approximation of a negative of a second derivative of the complex baseband signal.

40. The method of claim 38, further comprising:

detecting a frequency error in the complex baseband signal and generating a frequency error signal, based on a plurality of complex correlation values output from said averaging the multiplied signal;

detecting a phase error in the complex baseband signal and generating a phase error signal, based on the complex correlation value output from said averaging the multiplied signal;

controlling the frequency of the complex baseband signal based on the frequency error signal; and controlling the phase of the complex baseband signal based on the phase error signal, wherein the frequency error signal and the frequency error signal control the complex baseband signal simultaneously without mutual interference.

41. The method of claim 40, wherein said controlling the phase of the complex baseband signal applies the phase error signal for a time interval at a beginning of a first period of time over which the multiplied signal is averaged in said averaging the multiplied signal, the time interval being significantly smaller than the first period of time.

* * * * *